(12) United States Patent
Sasaki

(10) Patent No.: US 8,320,705 B2
(45) Date of Patent: Nov. 27, 2012

(54) IMAGE PROCESSING APPARATUS AND IMAGE PROCESSING METHOD

(75) Inventor: Hiroshi Sasaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 491 days.

(21) Appl. No.: 12/696,162

(22) Filed: Jan. 29, 2010

(65) Prior Publication Data

US 2010/0195926 A1 Aug. 5, 2010

(30) Foreign Application Priority Data

Feb. 2, 2009 (JP) ................................ 2009-021812

(51) Int. Cl.
*G06K 9/40* (2006.01)
(52) U.S. Cl. ....... 382/275; 382/260; 382/274; 358/3.26; 358/3.27
(58) Field of Classification Search .................. 382/260, 382/274, 275, 282; 358/3.26, 3.27, 463
See application file for complete search history.

(56) References Cited

U.S. PATENT DOCUMENTS

| | | | |
|---|---|---|---|
| 5,379,769 A * | 1/1995 | Ito et al. | 600/443 |
| 6,028,910 A * | 2/2000 | Kirchner et al. | 378/22 |
| 6,178,007 B1 * | 1/2001 | Harrington | 358/1.9 |
| 6,295,376 B1 * | 9/2001 | Nakaya | 382/236 |
| 6,640,145 B2 * | 10/2003 | Hoffberg et al. | 700/83 |
| 7,643,696 B2 | 1/2010 | Kita | |
| 7,643,699 B2 | 1/2010 | Lim et al. | |
| 2007/0177816 A1 | 8/2007 | Yoo et al. | |
| 2009/0010561 A1 | 1/2009 | Lee | |
| 2009/0219417 A1 | 9/2009 | Tsuruoka | |

FOREIGN PATENT DOCUMENTS

| | | |
|---|---|---|
| JP | 06-062283 A | 3/1994 |
| JP | 2006-302023 | 11/2006 |
| JP | 2006-229749 A | 8/2008 |
| WO | WO 2008/056565 | 5/2008 |

OTHER PUBLICATIONS

Notice of Allowance mailed May 24, 2012 in related U.S. Appl. No. 12/696,133.
U.S. Appl. No. 12/696,133; First Named Inventor: Hiroshi Sasaki; Title: "Image Processing Apparatus and Image Processing Method"; filed Jan. 29, 2010.

* cited by examiner

*Primary Examiner* — Yosef Kassa
(74) *Attorney, Agent, or Firm* — Holtz, Holtz, Goodman & Chick, PC

(57) ABSTRACT

The image processing apparatus according to the present invention includes a recording section that stores an image to be processed and a past image corresponding to the image to be processed, a pixel extraction section that extracts a first predetermined region including a target pixel in the image to be processed and a second predetermined region of the past image corresponding to the target pixel, a noise amount estimation section that estimates an amount of noise corresponding to the target pixel, a similitude calculating section that calculates a first similitude between the target pixel in the first predetermined region and pixels peripheral thereto and a second similitude between the target pixel in the first predetermined region and a pixel in the second predetermined region, a similitude feature value calculating section that calculates a feature value according to the similitude, a similitude correcting section that corrects the similitude based on the feature value, a filter coefficient calculating section that calculates a filter coefficient based on the corrected similitude, and a noise reduction section that reduces noise of the target pixel based on the filter coefficient.

20 Claims, 13 Drawing Sheets

| R | Gr | R | Gr |
|---|----|---|----|
| Gb | B | Gb | B |
| R | Gr | R | Gr |
| Gb | B | Gb | B |

IMAGE PROCESSING APPARATUS AND IMAGE PROCESSING METHOD

This application claims benefit of Japanese Application No. 2009-21812 filed in Japan on Feb. 2, 2009, the contents of which are incorporated by this reference.

BACKGROUND OL THE INVENTION

1. Field of the Invention

The present invention relates to an image processing apparatus and an image processing method, and more particularly, to an image processing apparatus and an image processing method that perform noise reduction processing on a video signal.

2. Description of Related Art

A video signal is a signal configured with a set of a plurality of frame images picked up at specified time intervals. Generally, it is possible to assume that each frame image is a signal having a correlation with respect to a local space within a frame, and further a neighboring frame is a signal having a correlation with respect to a local time between frames.

The aforementioned video signal can be obtained when, for example, an image of an arbitrary object is picked up using a video camera provided with an image pickup device such as CCD or CMOS, by photoelectrically converting object images formed on the image pickup device via lenses making up an image pickup section of the video camera in units of pixels making up the image pickup device and sequentially outputting the object images. Furthermore, the aforementioned video signal is amplified by an amplifier so as to have a predetermined brightness level and subjected to further processing as a digital image digitized by an A/D converter.

On the other hand, when an image of an object is picked up using the aforementioned video camera, noise ascribable to characteristics of the image pickup device is superimposed on the picked up image. Shot noise ascribable to the statistical nature of photoelectrical conversion accounts for the majority of the aforementioned noise.

Shot noise has average amplitude proportional to the square root of an image signal value, is known to be statistically random noise in a time direction and a spatial direction and appears noticeably when, for example, the amount of gain is increased in compensation for a shortage in amount of image forming light impinging on the image pickup device.

Examples of noise reduction processing on a video signal on which random noise such as the aforementioned shot noise is superimposed may include intra-frame noise reduction processing using a spatial correlation and inter-frame noise reduction processing using a time correlation, Various proposals are conventionally presented about intra-frame noise reduction processing using a spatial correlation and inter-frame noise reduction processing using a time correlation.

As noise reduction processing using a time correlation, for example, recursive noise reduction processing is known which can achieve a large amount of noise reduction by using frames after noise reduction as past frames.

On the other hand, Japanese Patent Application Laid-Open Publication No. 6-62283 describes a technique capable of improving noise reduction performance even on scene changes or scenes with large movement by using both an intra-frame correlation and an inter-frame correlation.

The noise reduction system described in Japanese Patent Application Laid-Open Publication No. 6-62283 has a configuration including an image memory for producing a one-frame or one-field delay, carrying out non-linear filter processing using newly inputted central pixel data, pixel data in the vicinity of the central pixel data and pixel data in the vicinity of the central pixel data in the pixel data one frame or one field before, which has already been recorded in the image memory and subjected to noise reduction, and thereby outputting noise reduced pixel data. According to the non-linear filter processing described in Japanese Patent Application Laid-Open Publication No. 6-62283, large weighting factors are assigned to data of neighboring pixels having a high correlation with the central pixel data, small weighting factors are assigned to pixels having a low correlation with the central pixel data and weighted averaging is performed.

According to the noise reduction system described in aforementioned Japanese Patent Application Laid-Open Publication No. 6-62283, it is possible to perform noise reduction processing using both an intra-frame correlation and an inter-frame correlation. Furthermore, according to the noise reduction system described in aforementioned Japanese Patent Application Laid-Open Publication No. 6-62283, especially when the picked up image is in a stationary condition, as the number of pixels with large weighting factors increases among pixels one frame or one field before and pixels in the current field used for weighted averaging, the number of pixels contributing to averaging increases, and it is thereby possible to effectively perform noise reduction. Furthermore, according to the noise reduction system described in Japanese Patent Application Laid-Open Publication No. 6-62283, when there is a large movement or scene change in a picked up image, larger weighting factors are automatically assigned to pixels in the current field than pixels one frame or one field before, and weighted averaging is performed substantially on pixels in the current field. Therefore, according to the noise reduction system described in Japanese Patent Application Laid-Open Publication No. 6-62283, even when there is a large movement or scene change in a picked up image, a sufficient noise reduction effect can be obtained though the effect is smaller than that in a stationary condition.

On the other hand, as a technique for attempting adaptive control over the structure included in an image and a noise reduction effect within the image, there is a technique described, for example, in Japanese Patent Application Laid-Open Publication No. 2006-229749.

Japanese Patent Application Laid-Open Publication No. 2006-229749 describes a technique that analyzes time correlativity and spatial correlativity, thereby performs texture judgment processing on a pixel to be processed and then adjusts a filter strength of a spatial filter in units of pixels subjected to time filter processing. To he more specific, Japanese Patent Application Laid-Open Publication No 2006-229749 describes a technique that calculates flatness of a target pixel based on texture judgment using pixels in the peripheral region thereof. increases the spatial filter strength when the flatness is large and reduces the spatial filter strength when the flatness is small.

Furthermore, as for a parameter of the filter strength, in the case, for example, of a common r filter, the absolute value of a difference between a target pixel used to judge whether or not to use the pixel as a smoothing pixel and pixels peripheral to the target pixel is used as a threshold. When such a method is used, the parameter of the filter strength is controlled so as to be spatial filter strength appropriate to the structure of the image and blurs of the structure in the image are suppressed and subjective image quality can thereby be improved.

SUMMARY OF THE INVENTION

The image processing apparatus according to the present invention is an image processing apparatus that performs noise reduction processing on images inputted on a time-series basis, including a recording section that stores an image to he processed and a past image corresponding to the image to be processed, a pixel extraction section that extracts a plurality of pixels in a first predetermined region including a target pixel in the image to be processed and a plurality of pixels in a second predetermined region of the past image corresponding to the target pixel stored in the recording section, a noise amount estimation section that estimates an amount of noise corresponding to the target pixel, a similitude calculating section that calculates a first similitude between the target pixel in the first predetermined region and pixels peripheral thereto and a second similitude between the target pixel in the first predetermined region and a pixel in the second predetermined region based on the amount of noise, a similitude feature value calculating section that calculates a first feature value according to the first similitude in the first predetermined region and a second feature value according to the second similitude in the second predetermined region, a similitude correcting section that corrects the first similitude and the second similitude based on the first feature value and the second feature value, a filter coefficient calculating section that calculates a filter coefficient corresponding to each pixel of the first predetermined region and each pixel of the second predetermined region based on the first similitude and the second similitude corrected by the similitude correcting section, and a noise reduction section that reduces noise of the target pixel based on the filter coefficient, The image processing method according to the present invention is an image processing method that performs noise reduction processing on images inputted on a time-series basis, including a recording step of storing an image to be processed and a past image corresponding to the image to be processed, a pixel extracting step of extracting a plurality of pixels in a first predetermined region including a target pixel in the images to be processed and a plurality of pixels in a second predetermined region of the past image corresponding to the target pixel stored in the recording step, a noise amount estimating step of estimating an amount of noise corresponding to the target pixel, a similitude calculating step of calculating a first similitude between the target pixel in the first predetermined region and pixels peripheral thereto and a second similitude between the target pixel in the first predetermined region and a pixel in the second predetermined region based on the amount of noise, a similitude feature value calculating step of calculating a first feature value according to the first similitude in the first predetermined region and a second feature value according to the second similitude in the second predetermined region, a similitude correcting step of correcting the first similitude and the second similitude based on the first feature value and the second feature value, a filter coefficient calculating step of calculating a filter coefficient corresponding to each pixel in the first predetermined region and each pixel in the second predetermined region based on the first similitude and the second similitude corrected in the similitude correcting step, and a noise reducing step of reducing noise of the target pixel based on the filter coefficient.

DETAILED DESCRIPTION OF PREFERRED EMBODIMENTS

Figure 1:
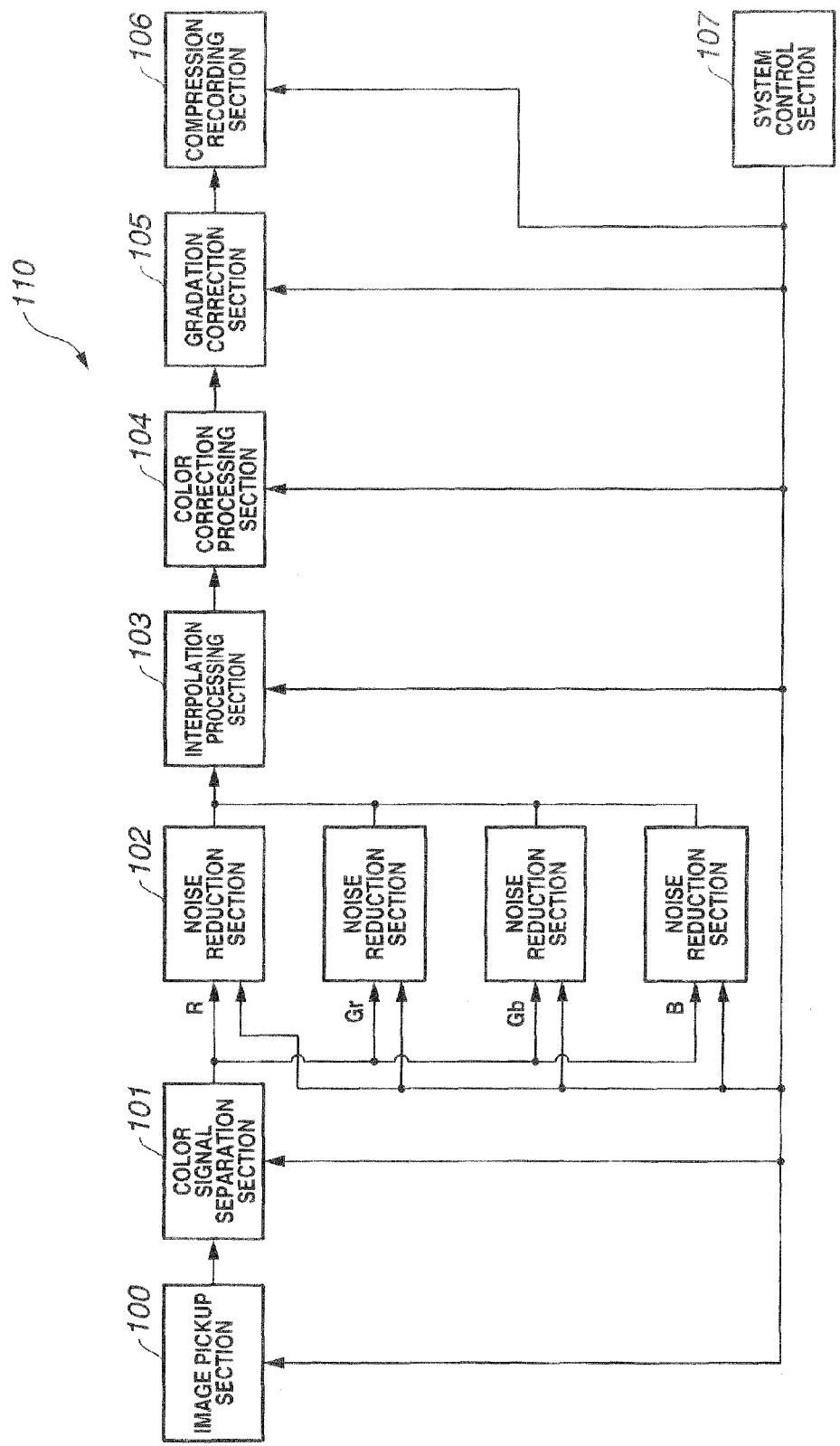
FIG. 1 is a function block diagram illustrating a configuration of main parts of an image processing apparatus according to an embodiment of the present invention.
Figure 2:
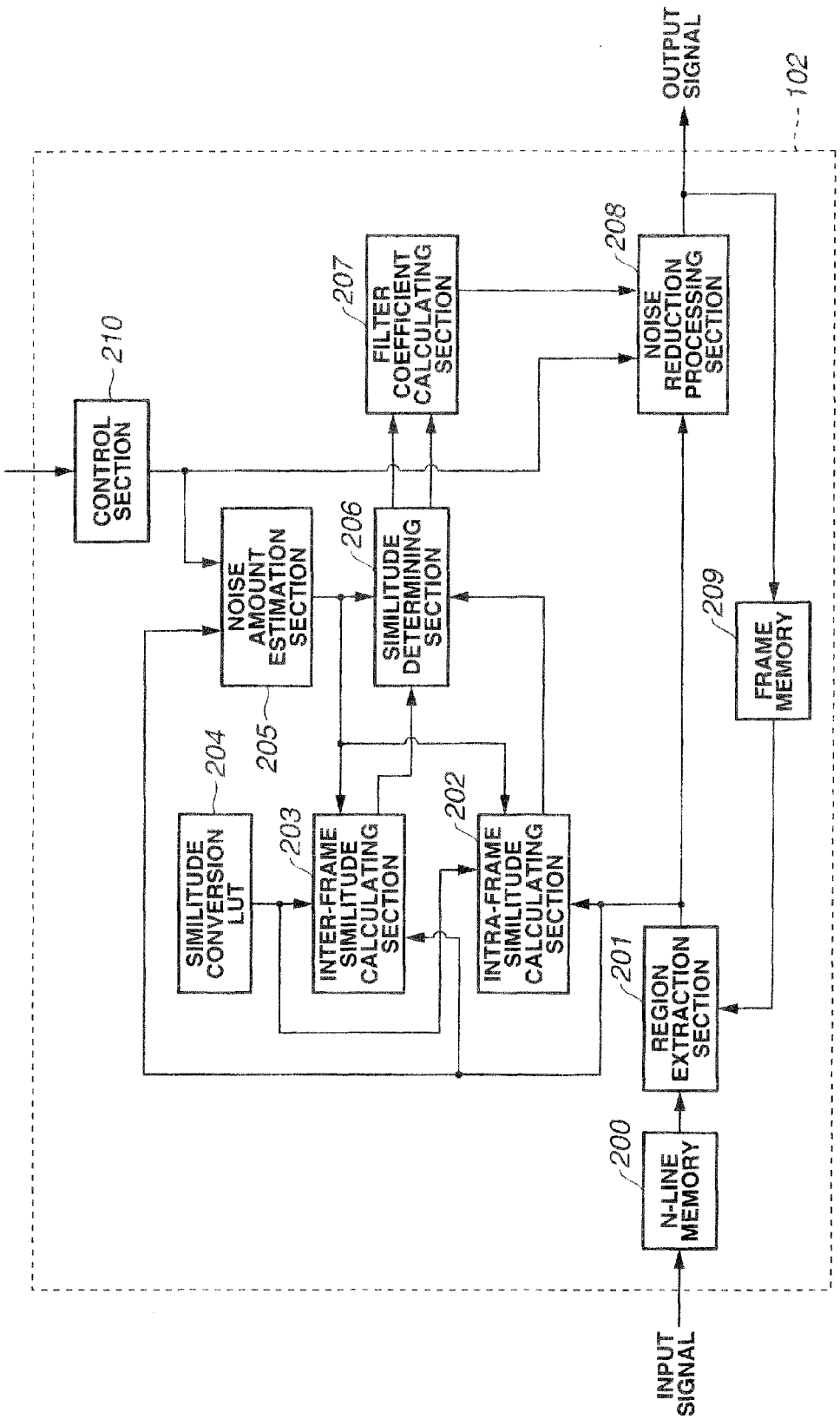
FIG. 2 is a function block diagram illustrating an example of a specific configuration of the noise reduction section according to the first embodiment.
Figure 3:
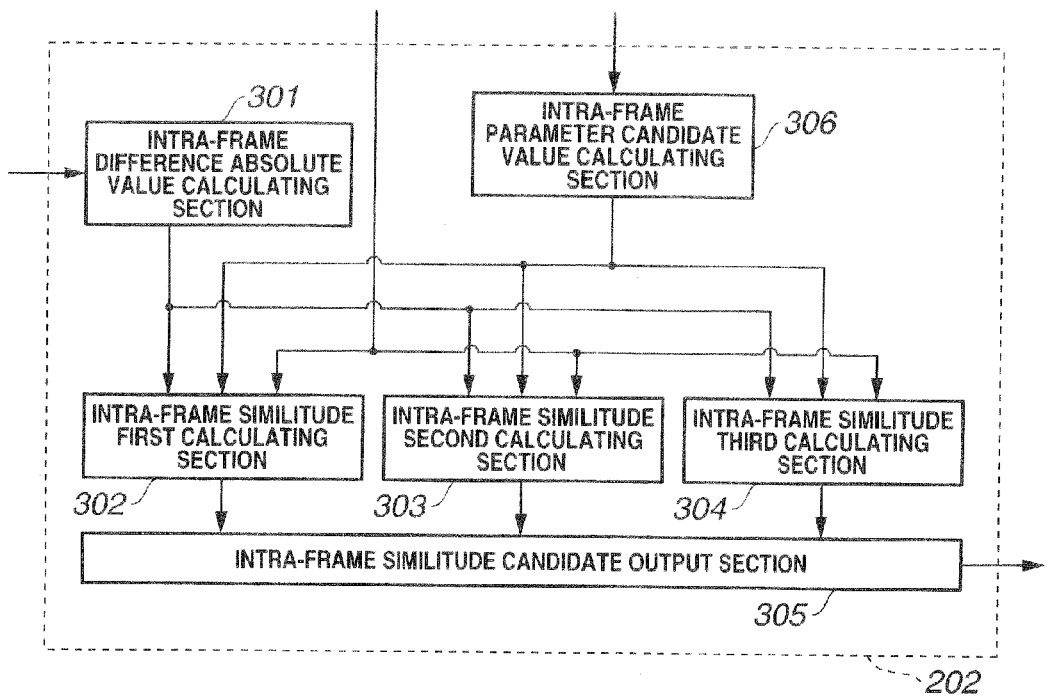
FIG. 3 is a function block diagram illustrating an example of a specific configuration of the intra-frame similitude calculating section of the noise reduction section in FIG. 2.
Figure 4:
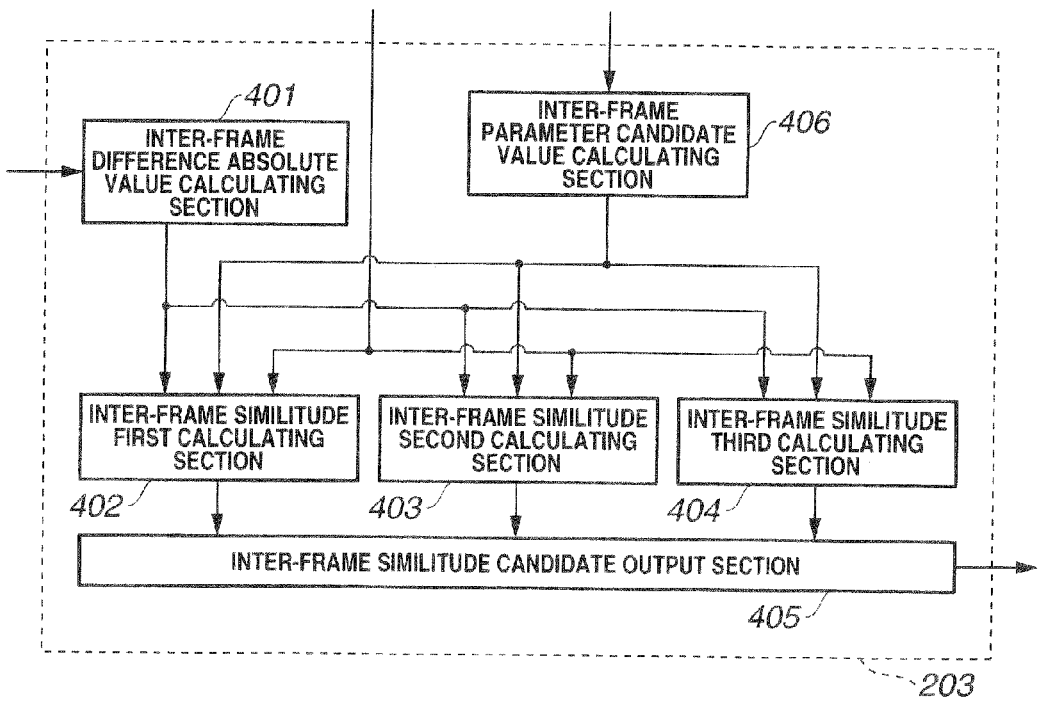
FIG. 4 is a function block diagram illustrating an example of a specific configuration of the inter-frame similitude calculating section of the noise reduction section in FIG. 2.
Figure 5:
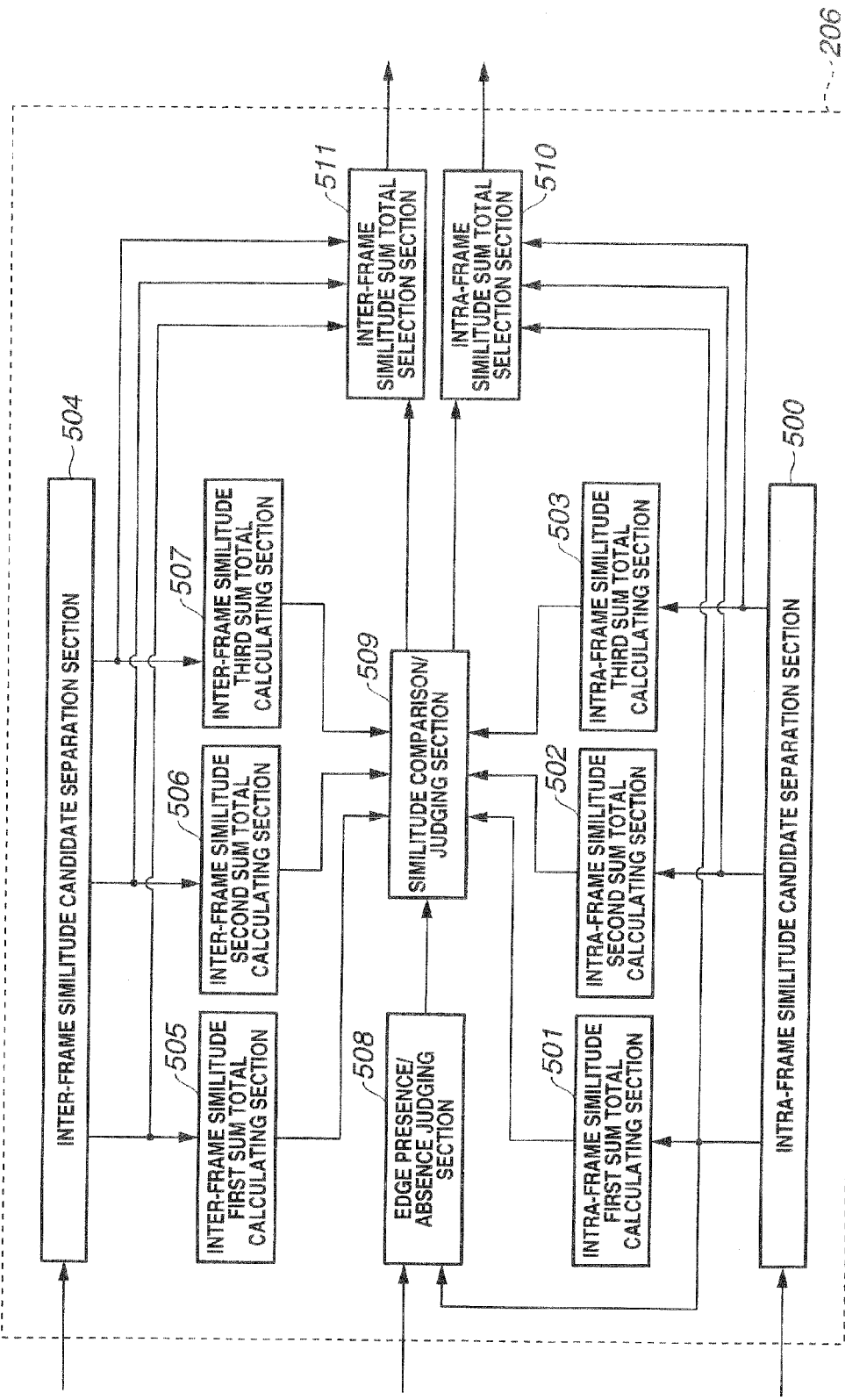
FIG. 5 is a function block diagram illustrating an example of a specific configuration of the similitude determining section of the noise reduction section in FIG. 2.
Figure 6:
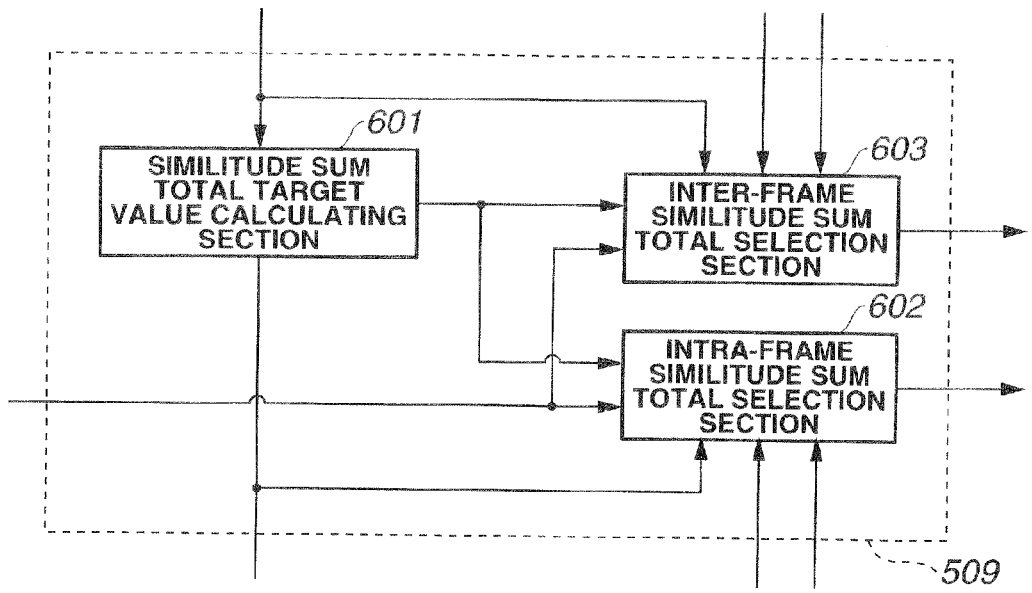
FIG. 6 is a function block diagram illustrating an example of a specific configuration of the similitude comparison/judging section of the similitude determining section in FIG. 5.
Figure 7:
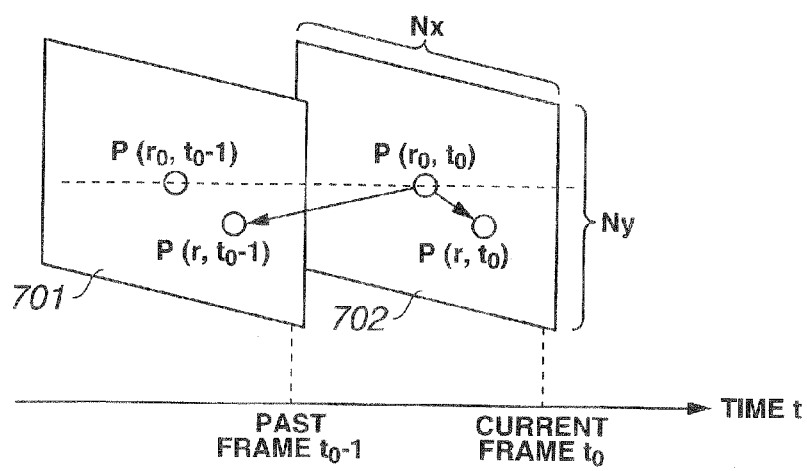
FIG. 7 is a schematic view illustrating a pixel to he processed and an extraction region peripheral thereto in a current frame and a past frame.

Hereinafter, embodiments of the present invention will be explained with reference to the accompanying drawings.
(First Embodiment)
FIG. 1 to FIG. 12 are related to a first embodiment of the present invention. FIG. 1 is a function block diagram illustrating a configuration of main parts of an image processing apparatus according to an embodiment of the present invention. FIG. 2 is a function block diagram illustrating an example of a specific configuration of the noise reduction section according to the first embodiment, FIG. 3 is a function block diagram illustrating an example of a specific configuration of the intra-frame similitude calculating section of the noise reduction section in FIG. 2. FIG. 4 is a function block diagram illustrating an example of a specific configuration of the inter-frame similitude calculating section of the noise reduction section in FIG. 2. FIG. 5 is a function block diagram illustrating an example of a specific configuration of the similitude determining section of the noise reduction section in FIG. 2, FIG. 6 is a function block diagram illustrating an example of a specific configuration of the similitude comparison/judging section of the similitude determining section in FIG. 5. FIG. 7 is a schematic view illustrating a pixel to he processed and an extraction region peripheral thereto in a current frame and a past frame.

Figure 8:
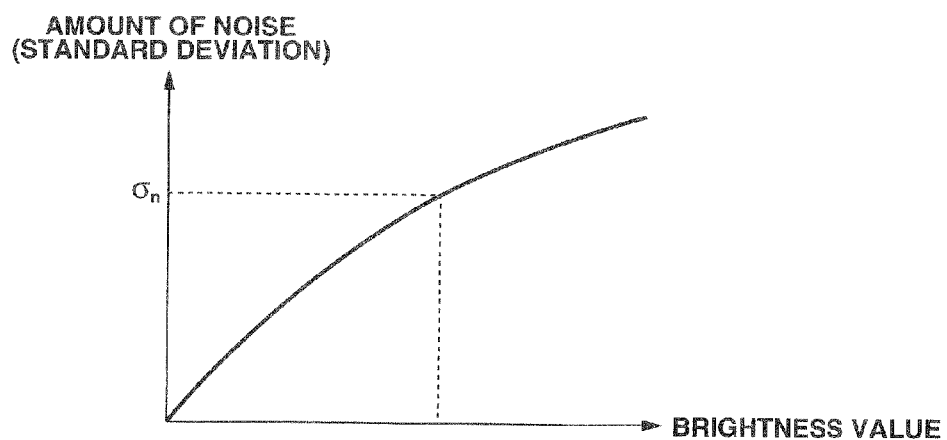
FIG. 8 is a diagram illustrating an example of relationship between a brightness value and a noise amount estimate.
Figure 9:
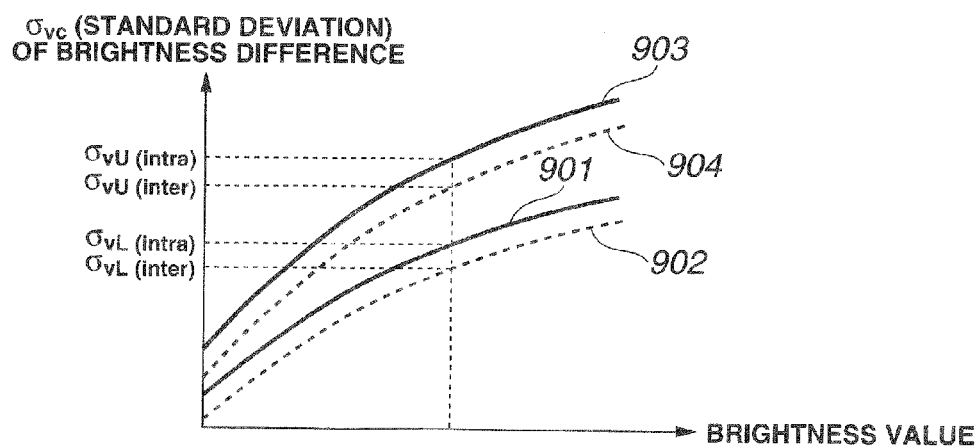
FIG. 9 is a diagram illustrating an upper limit value and a lower limit value in an intra-frame similitude calculation parameter and an upper limit value and a lower limit value in an inter-frame similitude calculation parameter.
Figure 10A:
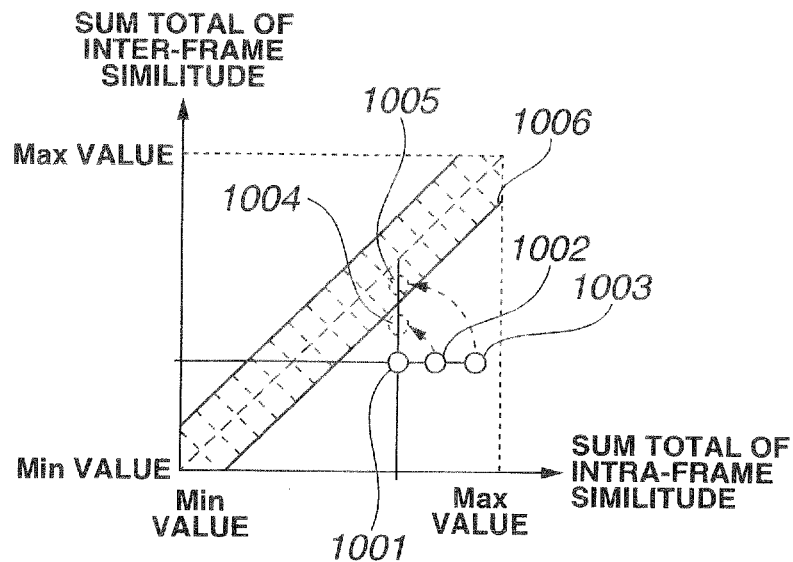
FIG. 10A is a conceptual diagram illustrating an example of relationship between the sum total of intra-frame similitude and the sum total of inter-frame similitude.
Figure 10B:
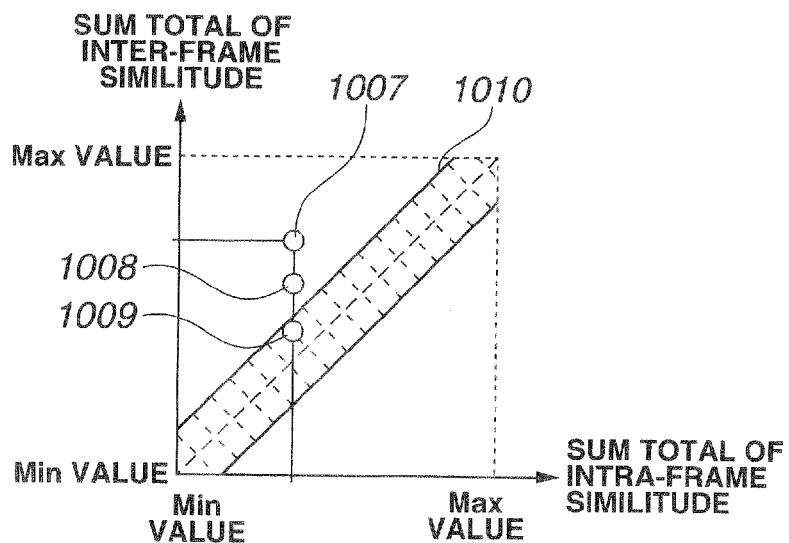
FIG. 10B is a conceptual diagram illustrating an example different from FIG. 10A of relationship between the sum total of intra-frame similitude and the sum total of inter-frame similitude.
Figure 11:
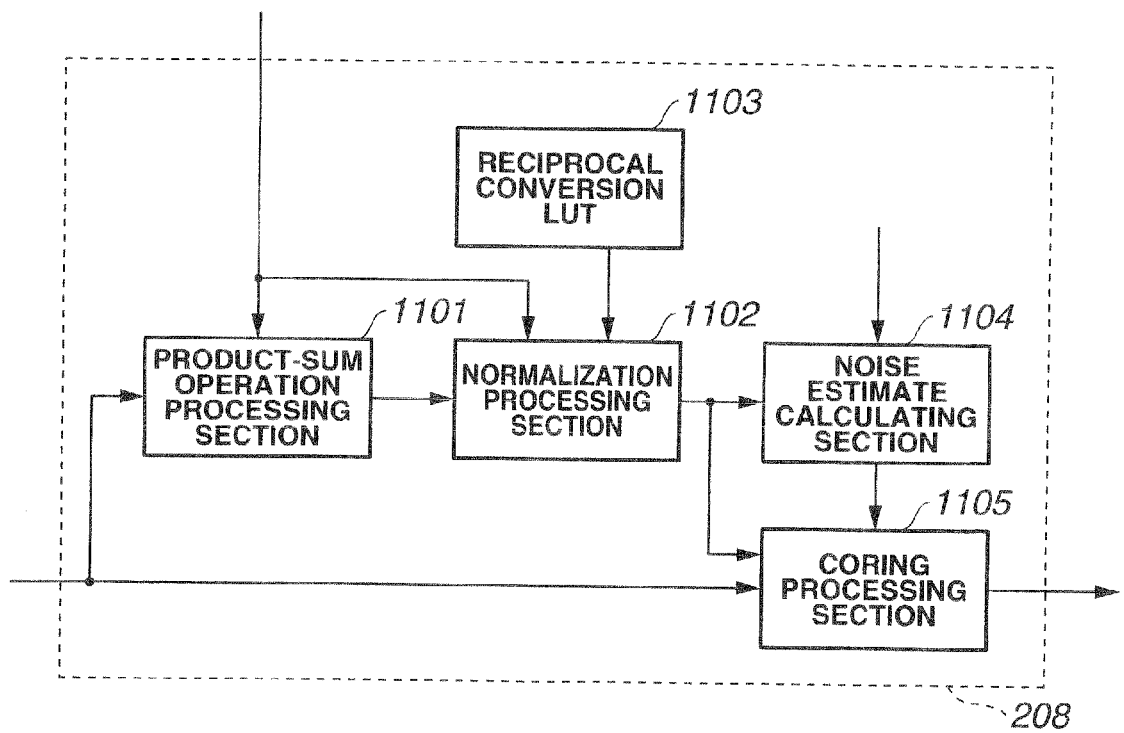
FIG. 11 is a function block diagram illustrating an example of a specific configuration of the noise reduction processing section of the noise reduction section in FIG. 2.
Figure 12:
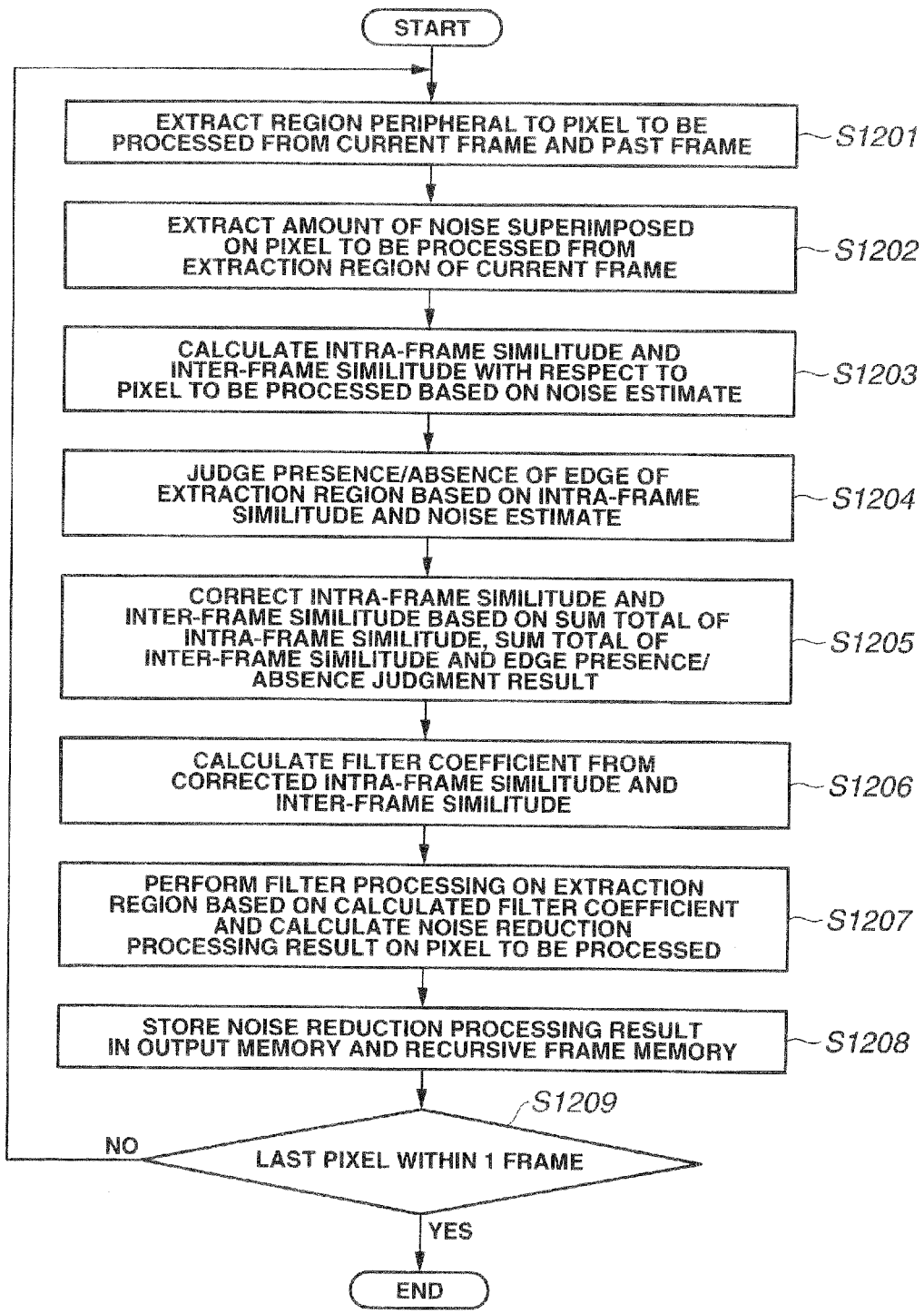
FIG. 12 is a flowchart illustrating a procedure of processing performed in the noise reduction section according to the first embodiment.

FIG. 8 is a diagram illustrating an example of relationship between a brightness value and a noise estimate. FIG. 9 is a diagram illustrating an upper limit value and a lower limit value in an intra-frame similitude calculation parameter and an upper limit value and a lower limit value in an inter-frame similitude calculation parameter. FIG. 10A is a conceptual diagram illustrating an example of a relationship between the sum total of intra-frame similitude and the sum total of inter-frame similitude. FIG. 10B is a conceptual diagram illustrating an example different from FIG. 10A of relationship between the sum total of intra-frame similitude and the sum total of inter-frame similitude. FIG. 11 is a function block diagram illustrating an example of a specific configuration of the noise reduction processing section of the noise reduction section in FIG. 2. FIG. 12 is a flowchart illustrating a procedure of processing performed in the noise reduction section according to the first embodiment.

As shown in FIG. 1, an image processing apparatus 110 is configured by including an image pickup section 100, a color signal separation section 101, a plurality of noise reduction sections 102, an interpolation processing section 103, a color correction processing section 104, a gradation correction section 105, a compression recording section 106 and a system control section 107.

The image pickup section 100 is configured by including a lens and an image pickup device (not shown). An image formed on the image pickup device via the lens of the image pickup section 100 is photoelectrically converted and outputted as an analog signal. The analog signal is then amplified by an amplification section (not shown), converted to digital data by an A/D conversion section (not shown) and then outputted to the color signal separation section 101.

Figures 17, 18:
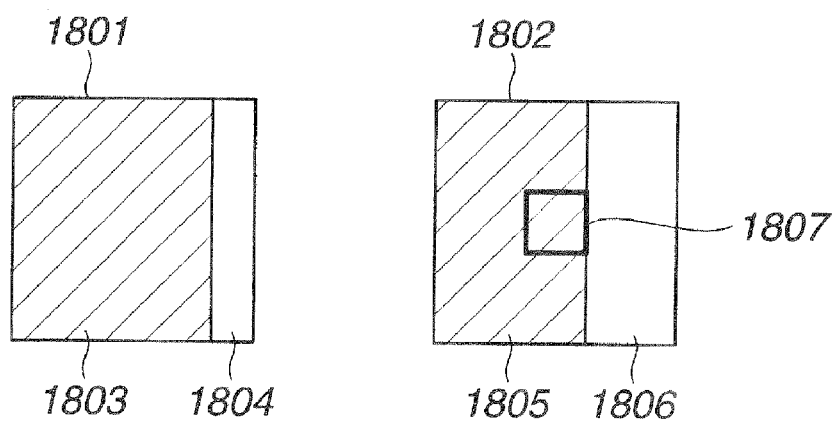
FIG. 17 is a diagram illustrating a filter arrangement of a Bayer array of single image pickup device.
FIG. 18 is a diagram illustrating a structure included in a region extracted from a current frame and a past frame.

In the present embodiment, the image pickup device of the image pickup section 100 will be described on the premise of a Bayer array of single device as shown in FIG. 17 with RGB primary color filters arranged in a checkered pattern on a chip of CCD or CMOS sensor or the like, one color arranged on each pixel, but the image pickup device is not limited to such an array. To be more specific, the image pickup device of the image pickup section 100 may be, for example, a single device having a complementary color filter of Cy, Mg, Ye and G or may have a multi configuration including a plurality of monochrome image pickup devices and a dichroic prism and forming images of light color-separated via the dichroic prism on the respective image pickup devices.

The color signal separation section 101 separates digital data from the image pickup section 100 into R, Gr, Gb and B pixel signals. The color signal separation section 101 then applies white balance processing to the respective separated pixel signals, multiplies the R signal and B signal by the gain for the G signal and then outputs the four color signals to their corresponding noise reduction sections 102.

The noise reduction section 102 applies noise reduction processing to each color signal outputted from the color signal separation section 101 and then outputs each color signal after the noise reduction processing to the interpolation processing section 103.

For a color signal having only one color per pixel, the interpolation processing section 103 uses pixel values of the same color and a different color in pixels peripheral to the one pixel to create interpolation signals of two colors, which do not exist in the one pixel. Through such processing, the interpolation processing section 103 generates synchronized RUB signals having three color signals per pixel and outputs the RUB signals to the color correction processing section 104.

The color correction processing section 104 performs processing of converting the RGB signals in a device color space ascribable to characteristics of the image pickup section 100 as the output signal from the interpolation processing section 103 to a color region (e.g., sRGB) of a monitor or the like to which the signal is outputted. The color correction processing section 104 then outputs the RGB signals subjected to the processing to the gradation correction section 105.

The gradation correction section 105 applies gradation conversion processing corresponding to the characteristics of the monitor or the like, to which the signal is outputted, to the RUB signals from the color correction processing section 104 and outputs the RUB signals after the gradation conversion processing to the compression recording section 106.

The compression recording section 106 converts the RUB signals from the gradation correction section 105 to a YCbCr signal which is a brightness color difference signal, applies high efficiency compression processing such as PEG or MPEG to the YCbCr signal, and records the signal after the high efficiency compression processing in a recording medium.

The system control section 107 outputs control signals for causing processing of the aforementioned respective sections to functionally operate in the image processing apparatus 110 as a whole. That is, the respective sections of the image processing apparatus 110 operate based on control signals outputted from the system control section 107 respectively.

Here, a specific configuration of the noise reduction section 102 will be described.

The noise reduction section 102 is configured by including an N-line memory 200, a region extraction section 201, an intra-frame similitude calculating section 202, an inter-frame similitude calculating section 203, a similitude conversion LUT 204, a noise amount estimation section 205, a similitude determining section 206, a filter coefficient calculating section 207, a noise reduction processing section 208, a frame memory 209 and a control section 210.

The N-line memory 200 receives one kind of color signal outputted from the color signal separation section 101 as current frame input image data. The current frame input image data is temporarily stored in the N-line memory 200 to absorb a time delay of noise reduction processing.

The region extraction section 201 reads the current frame input image data stored in the N-line memory 200 and image data preceding by 1 frame period (hereinafter, this frame will be referred to as a "past frame") already subjected to noise reduction processing and stored in the frame memory 209. As shown, for example, in FIG. 7, the region extraction section 201 then extracts a pixel to be processed $P(r_0, t_0)$ in a current frame 702, a region pixel $P(r, t_0)$ having a size of $N_x \times N_y$ pixel in the current frame 702 and a region pixel $P(r, t_0-1)$ located in spatially the same region as the current frame 702 in a past frame 701. The region extraction section 201 then outputs the respective extracted pixels to the intra-frame similitude calculating section 202, the inter-frame similitude calculating section 203, the noise amount estimation section 205, and the noise reduction processing section 208.

Here, suppose r denotes pixel positions in a rectangular region $N_x \times N_y$ centered on $r_0$, $t_0$ denotes a time in the current frame and $t_0-1$ denotes a time preceding the current frame by 1 frame.

Furthermore, since $P(r, t_0-1)$ is a signal already subjected to noise reduction, $P(r, t_0-1)$ is originally different from $P(r, t_0)$ which is the original signal before noise reduction. However, suppose the present embodiment will be described without making any distinction in notation between any parameters other than time-related parameters.

The noise amount estimation section 205 estimates the amount of noise superimposed on the pixel to be processed $P(r_0, t_0)$ corresponding to the region pixel $P(r, t_0)$ of the current frame inputted based on the region pixel $P(r, t_0)$ and a parameter inputted from the control section 210 and outputs the estimation result to the intra-frame similitude calculating section 202 and inter-frame similitude calculating section 203.

The amount of noise N(R) is estimated by the noise amount estimation section 205 based on a noise model as shown in FIG. 8 illustrating a relationship between a brightness value and an amount of noise, and a function Pa (amount of gain, exposure time, temperature, . . . ) based on the processing parameter from the control section 210. Furthermore, for the brightness value R. the pixel to be processed $P(r_0, t_0)$ itself may be used, or an average value of the region pixel $P(r, t_0)$ may be used or a result of applying bilateral filter processing to the region pixel $P(r, t_0)$ may be used. The processing performed by the noise amount estimation section 205 when estimating the amount of noise N(R) will be substantially the same as the processing performed by a noise estimate calculating section 1104. which will be described later. Thus, detailed descriptions thereof will he omitted here.

The intra-frame similitude calculating section 202 calculates intra-frame similitude candidates $Sc_1(r, t_0)$. $Sc_2(r, t_0)$ and $Sc_3(r, t_0)$ corresponding to the region pixel $P(r, t_0)$ made up of $N_x \times N_y$ pixels based on the amount of noise N(R) and the region pixel $P(r, t_0)$ of the current frame inputted, and outputs the calculation result to the similitude determining section 206.

Furthermore, the intra-frame similitude calculating section 202 calculates inter-frame similitude candidates $Sc_1(r, t_0-1)$, $Sc_2(r, t_0-1)$ and $Sc_3(r, t_0-1)$ corresponding to the region pixels made up of $N_x \times N_y$ pixels based on the amount of noise N(R) and the pixel to be processed $P(r_0, t_0)$ and a region pixel $P(r, t_0-1)$ of the past frame inputted and outputs the calculation result to the similitude determining section 206.

The similitude determining section 206 determines one similitude $S(r, t_0)$ from among the intra-frame similitude candidates $Sc_1(r, t_0)$, $Sc_2(r, t_0)$ and $Sc_3(r, t_0)$ inputted and determines one similitude $S(r, t_0-1)$ from among the inter-frame similitude candidates $Sc_1(r, t_0-1)$, $Sc_2(r, t_0-1)$ and $Sc_3(r, t_0-1)$. The similitude determining section 206 then outputs similitude $S(r, t_0)$ and similitude $S(r, t_0-1)$ as the determination result to the filter coefficient calculating section 207.

The filter coefficient calculating section 207 calculates a filter coefficient F(r, t), which becomes $N_x \times N_y \times 2$ based on the similitudes $S(r, t_0)$ and $S(r, t_0-1)$ inputted and outputs the calculation result to the noise reduction processing section 208. Here, suppose t is a variable that takes a value $t_0$ or $t_0-1$.

The noise reduction processing section 208 calculates a noise reduction processing pixel $P_0(r_0, t_0)$ corresponding to the pixel to be processed $P(r_0, t_0)$ based on the region pixel $P(r, t_0)$, the region pixel $P(r, t_0-1)$. the filter coefficient F(r, t) inputted and the processing parameter from the control section 210 and outputs the calculation result to the interpolation processing section 103 and the frame memory 209.

The frame memory 209 is configured by including a recording capacity corresponding to two frames. To be more specific. the frame memory 209 has a ring buffer configuration such that data is overwritten not in a past frame subjected to noise reduction processing 1 frame period before used for current noise reduction but in a past frame processed 2 frame periods before.

The control section 210 delivers parameters to/from the system control section 107. To be more specific, the control section 210 outputs a processing parameter regarding noise amount calculation processing, which is a parameter ascribable to the image pickup section 100 and the color signal separation section 101 out of parameter information outputted from the system control section 107, to the noise amount estimation section 205 and the noise reduction processing section 208.

Next, a detailed configuration of the intra-frame similitude calculating section 202 will he described with reference to FIG. 3.

The intra-frame similitude calculating section 202 is configured by including an intra-frame difference absolute value calculating section 301, an intra-frame similitude first calculating section 302, an intra-frame similitude second calculating section 303, an intra-frame similitude third calculating section 304, an intra-frame similitude candidate output section 305 and an intra-frame parameter candidate value calculating section 306.

The intra-frame difference absolute value calculating section 301 calculates a difference value 1)(r, $t_0$) by taking an absolute value of a difference value between the pixel to be processed $P(r_0, t_0)$ included in the region pixel $P(r, t_0)$ inputted and $P(r, t_0)$ while using equation (1) below, then outputs the calculation result to the intra-frame similitude first calculating section 302, the intra-frame similitude second calculating section 303 and the intra-frame similitude third calculating section 304.

$$D(r, t_0) = |P(r, t_0) - P(r_0, t_0)| \ldots \quad (1)$$

The intra-frame parameter candidate value calculating section 306 determines a lower limit value $\sigma_{vL(intra)}$, an intermediate value $\sigma_{vM(intra)}$ and an upper limit value $\sigma_{vU(intra)}$, which are parameters corresponding to the amount of noise N(R) outputted from the noise amount estimation section 205. The intra-frame parameter candidate value calculating section 306 then outputs the lower limit value $\sigma_{vL(intra)}$ to the intra-frame similitude first calculating section 302, outputs the intermediate value $\sigma_{vM(intra)}$ to the intra-frame similitude second calculating section 303 and outputs the upper limit value $\sigma_{vU(intra)}$ to the intra-frame similitude third calculating section 304. Here, the parameters; the lower limit value $\sigma_{vL(intra)}$, the intermediate value $\sigma_{vM(intra)}$ and the upper limit value $\sigma_{vU(intra)}$ are functions of the brightness value R predetermined in correspondence with the amount of noise N(R) and are expressed, for example, by following equations (2), (3) and (4).

$$\sigma_{vL(intra)}(R) = \alpha_L \times N(R) + \beta_L \quad (2)$$

$$\sigma_{vM(intra)}(R) = \{(\alpha_L + \alpha_U) \times N(R) + (\beta_L + \beta_U)\}/2 \quad (3)$$

$$\sigma_{vU(intra)}(R) = \alpha_U \times N(R) + \beta_U \quad (4)$$

Here, $\alpha_L$, $\beta_L$, $\alpha_U$ and $\beta_U$ are coefficient values predetermined so as to have relationships of $\alpha_L < \alpha_U$, $\beta_L \leq \beta_U$. Furthermore, the amount of noise N(R) is a function dependent on the brightness value R.

Here, the above described three parameters are the values to normalize the above described D(r, t₀) based on the amount of noise. To be more specific, the lower limit value $\sigma_{vL(intra)}$(R) for the brightness R corresponds to reference numeral 901 in FIG. 9 and the upper limit value $\sigma_{vU(intra)}$(R) for the brightness R corresponds to reference numeral 903 in FIG. 9.

The intra-frame similitude first calculating section 302 converts the inputted values of the difference value D(r, t₀) and $\sigma_{vL(intra)}$(R) to similitude $Sc_1$(r, t₀) as a Gaussian function value by looking up the table of the similitude conversion LUT 204. The conversion equation used in this case is expressed by following equation (5).

$$Sc_1(r, t_0) = \exp(-\{D(r, t_0)/\sigma_{vL(intra)}(R)\}^2/2) \qquad (5)$$

The intra-frame similitude second calculating section 303 converts the inputted values of the difference value D(r, t₀) and $\sigma_{vM(intra)}$(R) to similitude $Sc_2$(r, t₀) as a Gaussian function value by looking up the table of the similitude conversion LUT 204. The conversion equation used here is expressed by following equation (6).

$$Sc_2(r, t_0) = \exp(-\{D(r, t_0)/\sigma_{vM(intra)}(R)\}^2/2) \qquad (6)$$

The intra-frame similitude third calculating section 304 converts the inputted values of the difference value D(r, t₀) and $\sigma_{vU(intra)}$(R) to similitude $Sc_3$(r, t₀) as a Gaussian function value by looking up the table of the similitude conversion LUT 204. The conversion equation used here is expressed by following equation (7).

$$Sc_3(r, t_0) = \exp(-\{D(r, t_0)/\sigma_{vU(intra)}(R)\}^2/2 \qquad (7)$$

These similitudes $Sc_1$(r, t₀), $Sc_2$(r, t₀) and $Sc_3$(r, t₀) are outputted to the intra-frame similitude candidate output section 305.

The intra-frame similitude candidate output section 305 time division multiplexes the inputted similitudes $Sc_1$(r, t₀), $Sc_2$(r, t₀) and $Sc_3$(r, t₀) and outputs the result to the similitude determining section 206.

Next, details of the configuration of the inter-frame similitude calculating section 203 will be described with reference to FIG. 4.

The inter-frame similitude calculating section 203 is configured by including an inter-frame difference absolute value calculating section 401, an inter-frame similitude first calculating section 402, an inter-frame similitude second calculating section 403, an inter-frame similitude third calculating section 404, an inter-frame similitude candidate output section 405 and an inter-frame parameter candidate value calculating section 406.

The inter-frame difference absolute value calculating section 401 calculates a difference value D(r, t₀−1) by taking an absolute value of a difference value between the region pixel P(r, t₀−1) and the pixel to be processed P(r₀, t₀) inputted using following equation (8), and then outputs the calculation result to the inter-frame similitude first calculating section 402, the inter-frame similitude second calculating section 403 and the inter-frame similitude third calculating section 404.

$$D(r, t_0-1) = |P(r, t_0-1) - P(r_0, t_0)| \qquad (8)$$

The inter-frame parameter candidate value calculating section 406 determines a lower limit value $\sigma_{vL(inter)}$, an intermediate value $\sigma_{vM(inter)}$ and an upper limit value $\sigma_{vU(inter)}$, which are parameters corresponding to the amount of noise N(R) outputted from the noise amount estimation section 205. The inter-frame parameter candidate value calculating section 406 then outputs the upper limit value $\sigma_{vU(inter)}$ to the inter-frame similitude first calculating section 402, outputs the intermediate value $\sigma_{vM(inter)}$ to the inter-frame similitude second calculating section 403 and outputs the lower limit $\sigma_{vL(inter)}$ to the inter-frame similitude third calculating section 404. Here, the parameters; the lower limit value $\sigma_{vL(inter)}$, the intermediate value $\sigma_{vM(inter)}$ and the upper limit value $\sigma_{vU(inter)}$ are functions of the brightness value R predetermined in correspondence with the amount of noise N(R) and are expressed, for example, by following equations (9), (10) and (11).

$$\sigma_{vL(inter)}(R) = Y_L \times N(R) + \delta_L \qquad (9)$$

$$\sigma_{vM(inter)}(R) = \{(Y_L + \delta_U) \times N(R) + (Y_L + \delta_U)\}/2 \qquad (10)$$

$$\sigma_{vU(inter)}(R) = Y_U \times N(R) + \delta_U \qquad (11)$$

Here, $Y_L$, $\delta_L$, $Y_U$ and $\delta_U$ are coefficient values predetermined so as to have relationships of $Y_L < Y_U$, $\delta_L \leq \delta_U$. Furthermore, the amount of noise N(R) is a function dependent on the brightness value R.

Here, the above described three parameters are the values to normalize the above described D(r, t₀−1) based on the amount of noise. To be more specific, the lower limit value $\sigma_{vL(inter)}$(R) for the brightness R corresponds to reference numeral 902 in FIG. 9 and the upper limit value $\sigma_{vU(inter)}$(R) for the brightness R corresponds to reference numeral 904 in FIG. 9.

As shown in FIG. 9, the upper and lower limit values, the parameters used to calculate the inter-frame similitude are relatively small with respect to the upper and lower limit values, the parameters used to calculate the intra-frame similitude because the fact that the past frame is a signal already subjected to noise reduction is taken into consideration. Furthermore. in order to prevent afterimages from occurring, $Y_L$ and $Y_U$, and $\delta_L$ and $\delta_U$ may be set to still smaller coefficient values.

The inter-frame similitude first calculating section 402 converts the inputted values of the difference value D(r, t₀−1) and $\sigma_{vU(inter)}$(R) to $Sc_1$(r, t₀−1) as a Gaussian function value by looking up the table of the similitude conversion TUT 204. The conversion equation used in this case is expressed by following equation (12).

$$Sc_1(r, t_0-1) = \exp(-\{D(r, t_0-1)/\sigma_{vU(inter)}(R)\}/2) \qquad (12)$$

The inter-frame similitude second calculating section 403 converts the inputted values of the difference value D(r, t₀−1) and $\sigma_{vL(inter)}$(R) to $Sc_2$(r, t₀−1) as a Gaussian function value by looking up the table of the similitude conversion LUT 204. The conversion equation used here is expressed by following equation (13).

$$Sc_2(r, t_0-1) = \exp(-\{D(r, t_0-1)/\sigma_{vM(inter)}(R)\}^2/2) \qquad (13)$$

The inter-frame similitude third calculating section 404 converts the inputted values of the difference value D(r, t₀−1) and $\sigma_{vL(inter)}$(R) to $Sc_3$(r, t₀−1) as a Gaussian function value by looking up the table of the similitude conversion LUT 204. The conversion equation used here is expressed by following equation (14).

$$Sc_3(r, t_0-1) = \exp(-\{D(r, t_0-1)/\sigma_{vL(inter)}(R)\}^2/2 \qquad (14)$$

These similitudes $Sc_1$(r, t₀−1), $Sc_2$(r, t₀−1) and $Sc_3$(r, t₀−1 are outputted to the inter-frame similitude candidate output section 405.

The inter-frame similitude candidate output section 405 time division multiplexes the inputted similitudes $Sc_1$(r, t₀−1), $Sc_2$(r, t₀−1) and $Sc_3$(r, t₀−1) and outputs the result to the similitude determining section 206.

Next, details of the configuration of the similitude determining section 206 will be described with reference to FIG. 5.

The similitude determining section 206 is configured by including an intra-frame similitude candidate separation section 500, an intra-frame similitude first sum total calculating section 501, an intra-frame similitude second sum total calculating section 502, an intra-frame similitude third sum total calculating section 503, an inter-frame similitude candidate separation section 504, an inter-frame similitude first sum total calculating section 505, an inter-frame similitude second sum total calculating section 506, an inter-frame similitude third sum total calculating section 507, an edge presence/absence judging section 508, a similitude comparison/judging section 509, an intra-frame similitude selection section 510 and an inter-frame similitude selection section 511.

The intra-frame similitude candidate separation section 500 receives the multiplexed similitudes $Sc_1(r, t_0)$, $Sc_2(r, t_0)$ and $Sc_3(r, t_0)$. The intra-frame similitude candidate separation section 500 then separates the multiplexed similitudes $Sc_1(r, t_0)$, $Sc_2(r, t_0)$ and $Sc_3(r, t_0)$, then outputs the similitude $Sc_1(r, t_0)$ to the intra-frame similitude first sum total calculating section 501, outputs the similitude $Sc_2(r, t_0)$ to the intra-frame similitude second sum total calculating section 502 and outputs the similitude $Sc_3(r, t_0)$ to the intra-frame similitude third sum total calculating section 503.

The intra-frame similitude first sum total calculating section 501 calculates the sum total value in the $N_x \times N_y$ region corresponding to the similitude $Sc_1(r, t_0)$ and outputs the calculation result to the similitude comparison/judging section 509.

The intra-frame similitude second sum total calculating section 502 calculates the sum total value in the $N_x \times N_y$ region corresponding to the similitude $Sc_2(r, t_0)$ and outputs the calculation result to the similitude comparison/judging section 509.

The intra-frame similitude third sum total calculating section 503 calculates the sum total value in the $N_x \times N_y$ region corresponding to the similitude $Sc_3(r, t_0)$ and outputs the calculation result to the similitude comparison/judging section 509.

The inter-frame similitude first sum total calculating section 505 calculates the sum total value in the $N_x \times N_y$ region corresponding to the similitude $Sc_1(r, t_0-1)$ and outputs the calculation result to the similitude comparison/judging section 509.

The inter-frame similitude second sum total calculating section 506 calculates the sum total value in the $N_x \times N_y$ region corresponding to the similitude $Sc_2(r, t_0-1)$ and outputs the calculation result to the similitude comparison/judging section 509.

The inter-frame similitude third sum total calculating section 507 calculates the sum total value in the $N_x \times N_y$ region corresponding to the similitude $Sc_3(r, t_0-1)$ and outputs the calculation result to the similitude comparison/judging, section 509.

The edge presence/absence judging section 508 judges the presence/absence of an edge within the extraction region based on the amount of noise $N(R)$ from the noise amount estimation section 205 and the similitude $Sc_i(r, t_0)$ from the intra-frame similitude candidate separation section 500, and outputs the judgment result to the similitude comparison/judging section 509.

Here, the edge presence/absence judging section 508 judges the presence/absence of an edge depending on whether or not the extraction region corresponding to the similitude $Sc_1(r, t_0)$ is a region showing a sufficiently large brightness variation with respect to the amount of noise estimated by the noise amount estimation section 205.

To be more specific, the edge presence/absence judging section 508 creates a similitude converted as a value that can be absolutely evaluated in the whole image by multiplying the similitude $Sc_1(r, t_0)$ normalized with a coefficient corresponding to the amount of noise by the amount of noise $N(R)$ inputted from the noise amount estimation section 205. Next, the edge presence/absence judging section 508 calculates a maximum variation (amount of dynamic range in the extraction region) with respect to the converted similitude and then compares the maximum variation with a predetermined threshold $TH_e$. The edge presence/absence judging section 508 judges that there is an edge when the maximum variation is greater than the threshold $TH_e$ and judges that there is no edge when the maximum variation is equal to or below the threshold $TH_e$.

Next, a detailed configuration of the similitude comparison/judging section 509 will be described with reference to FIG. 6.

The similitude comparison/judging section 509 is configured by including a similitude sum total target value calculating section 601, an intra-frame similitude sum total selection section 602 and an inter-frame similitude sum total selection section 603.

The similitude sum total target value calculating section 601 makes a comparison in magnitude between the similitude sum total value $\Sigma Sc_1(r, t_0)$ outputted from the intra-frame similitude first sum total calculating section 501 and the similitude sum total value $\Sigma Sc_1(r, t_0-1)$ outputted from the inter-frame similitude first sum total calculating section 505. Here, denotes a sum total with respect to r and will also be described as $\Sigma_r$ hereinafter.

To be more specific, upon detecting that $\Sigma Sc_1(r, t_0) > \Sigma Sc_1(r, t_0-1) + \epsilon$, the similitude sum total target value calculating section 601 judges that the intra-frame correlation is higher than the inter-frame correlation (first type). Furthermore, upon detecting that $\Sigma Sc_1(r, t_0) + \epsilon < \Sigma Sc_1(r, t_0-1)$, the similitude sum total target value calculating section 601 judges that the inter-frame correlation is higher than the intra-frame correlation (second type). Furthermore, upon detecting that $|\Sigma Se_1(r, t_0) - \Sigma Sc_1(r, t_0-1)| \leq \epsilon$, the similitude sum total target value calculating section 601 judges that intra-frame and inter-frame have substantially equal correlations (third type). $\epsilon$ is a constant that defines a variation of similitude that varies depending on noise.

The similitude sum total target value calculating section 601 then outputs the judgment result of comparison between the similitude sum total value $\Sigma Sc_1(r, t_0)$ and the similitude sum total value $\Sigma Sc_1(r, t_0-1)$ to the intra-frame similitude sum total selection section 602 and the inter-frame similitude sum total selection section 603.

The intra-frame similitude sum total selection section 602 receives the judgment result by the similitude sum total target value calculating section 601, the similitude sum total value $\Sigma Sc_1(r, t_0)$ calculated by the intra-frame similitude first sum total calculating section 501, the similitude sum total value $\Sigma Sc_2(r, t_0)$ calculated by the intra-frame similitude second sum total calculating section 502 and the similitude sum total value $\Sigma Sc_3(r, t_0)$ calculated by the intra-frame similitude third sum total calculating section 503. The intra-frame similitude sum total selection section 602 then outputs an index value of the sum total corresponding to a similitude appropriate for the subsequent noise reduction processing to the intra-frame similitude selection section 510 based on the similitude sum total value $\Sigma Sc_1(r, t_0)$, $\Sigma Sc_2(r, t_0)$ and $\Sigma Sc_3(r, t_0)$.

The inter-frame similitude sum total selection section 603 receives the judgment result of the similitude sum total target value calculating section 601, the similitude sum total value $\Sigma Sc_1(r, t_0-1)$ calculated by the inter-frame similitude first sum total calculating section 505, the similitude sum total value $\Sigma Sc_2(r, t_0-1)$ calculated by the inter-frame similitude second sum total calculating section 506 and the similitude sum total value $\Sigma Sc_3(r, t_0-1)$ calculated by the inter-frame similitude third sum total calculating section 507. The inter-frame similitude sum total selection section 603 then outputs an index value of the sum total corresponding to a similitude appropriate to the subsequent noise reduction processing to the inter-frame similitude selection section 511.

Here, the sum total selection processing will be described based on FIG. 10A and FIG. 10B or the like, which illustrate a relationship between the sum total of the intra-frame similitude and the sum total of inter-frame similitude.

The first type corresponding to $\rho Sc_1(r, t_0) > \Sigma Sc_1(r, t_0-1)+\epsilon$ is located in a region at the right bottom of FIG. 10A and FIG. 10B. This region corresponds to a dynamic region and corresponds to a state in which the number of pixels having a high correlation with the pixel to be processed $P(r_0, t_0)$ has decreased within the extracted pixel $P(r, t_0-1)$ of a predetermined region from the past frame.

Furthermore, the second type corresponding to $\Sigma Sc_1(r, t_0)+\epsilon < \Sigma Sc_1(r, t_0-1)$ is located in a region at the top left of FIG. 10A and FIG. 10B. This region corresponds to a dynamic region and corresponds to a state in which the number of pixels having a high correlation with the pixel to be processed $P(r_0, t_0)$ has increased within the extracted pixel $P(r, t_0-1)$ of a predetermined region from the past frame.

For example, as shown in FIG. 18, when there are two flat regions 1803 and 1804 having edges in the past frame extraction region 1801 and two flat regions 1805 and 1806 having edges in the current frame extraction region 1802, and the position of the pixel to be processed $P(r_0, t_0)$ is assumed to be the position indicated by reference numeral 1807, the state corresponding to the aforementioned second type may be any one of a state in which the number of pixels having a high correlation of the past frame is greater than the number of pixels having a high correlation of the current frame and a state in which the past frame extraction region and the current frame extraction region have completely different structures and many pixels having a large apparent correlation are generated in the past frame. In the latter example in particular, many pixels having a large apparent correlation may be generated in a micro structure region affected by the amount of noise introduced.

Furthermore, the third type corresponding to $|\Sigma Se_1(r, t_0) - \Sigma Sc_1(r, t_0-1)| \leq \epsilon$ is located in a region of the central area shown by a group of dotted diagonal lines in FIG. 10A and FIG. 1013, This region corresponds to a stationary region or a quasi-stationary region, and corresponds to a case where intra-frames have a correlation on par with that of inter-frames.

Point 1001 in FIG. 10A illustrates an example of value corresponding to the aforementioned first type. Point 1002 in FIG. 10A illustrates a value of the intra-frame similitude $Sc_2(r, t_0)$ and inter-frame similitude $Sc_1(r, t_0-1)$. Point 1003 in FIG. 10A illustrates values of the intra-frame similitude $Sc_3(r, t_0)$ and the inter-frame similitude $Sc_1(r, t_0-1)$.

Point 1001 in FIG. 10A corresponds to a dynamic region as described above and illustrates astute in which the sum total of inter-frame similitude is relatively small with respect to the sum total of intra-frame similitude. In this state, smoothing processing is performed using only pixels having high intra-frame correlations, and therefore the noise reduction effect cannot be obtained sufficiently as the amount of noise introduced increases.

When the pixel to be processed $P(r_0, t_0)$ is located on a boundary of a steep edge section in particular, noise is not reduced sufficiently, and therefore an obtrusive state may be generated in which a noisy region moves together with the movement of the edge, Here, a case is assumed as a precondition that such a small parameter a $\sigma_{vU(inter)}(R)$ is adopted that it is possible to obtain an inter-frame similitude $Sc_1(r, t_0-1)$ whereby no afterimage phenomenon may be produced by movement in the periphery of the edge section.

Thus, in order to reduce the obtrusive state that may occur when the pixel to be processed $P(r_0, t_0)$ is located at the aforementioned position, the state in which the inter-frame similitude $Sc_1(r, t_0-1)$ is reduced is compensated and modified so that the intra-frame similitude $Sc_1(r, t_0)$ increases. Examples of compensation candidates may include the values of point 1002 and point 1003 in FIG. 10A, It is possible to prevent obtrusive noise from occurring by improving the noise reduction effect using any one of the values of point 1002 and point 1003 in FIG. 10A. whichever is more appropriate.

Here, of the values of point 1002 and point 1003 in FIG. 10A, compensation candidates more appropriate to noise reduction are selected, for example. by comparing point 1004 resulting from rotating point 1002 around point 1001 by 90 degrees with point 1005 resulting from rotating point 1003 around point 1001 by 90 degrees, To be more specific, one compensation candidate is selected according to a comparison result as to whether or not point 1004 and point 1005 are included in the region of the central area shown by dotted diagonal lines in FIG. 10A and which of point 1004 and point 1005 is closer to the boundary line 1006.

In the example shown in FIG. 10A, since point 1005 is included in the region of the central area shown by dotted diagonal lines, the value of point 1003 corresponding to point 1005 is selected as the compensation candidate more appropriate to noise reduction. That is, the condition involved in the aforementioned selection of a compensation candidate more appropriate to noise reduction means approximating to the sum total of similitude when a stationary state is assumed and is set based on the effect that by setting the amount of noise reduction to a level on par with a stationary state, the difference in the amount of noise reduction produced on the boundary with the dynamic region is suppressed when the background is a stationary region.

Point 1007 in FIG. 10B illustrates a value corresponding to the aforementioned second type. Point 1008 in FIG. 10B illustrates a value of the intra-frame similitude $Sc_1(r, t_0)$ and inter-frame similitude $Sc_2(r, t_0-1)$. Point 1009 in FIG. 10B illustrates a value of the intra-frame similitude $Sc_1(r, t_0)$ and inter-frame similitude $Sc_3(r, t_0-1)$.

Point 1007 in FIG. 10B corresponds to a dynamic region as described above, and shows a state in which the sum total of intra-frame similitude is relatively small with respect to the sum total of inter-frame similitude. In this state, as described above, the subsequent processing differs depending on whether the state is caused by the edge section or a pattern with no correlation.

In the former case (caused by the edge section), a noise reduction effect can be obtained using the value of point 1007 as is. On the other hand, in the latter case (caused by a pattern with no correlation), if the value of point 1007 is used, smoothing is performed using pixels that behave as if there is an apparent correlation due to influences of noise, and therefore the micro structure of the image may be crushed.

Thus, the value of point 1007 is switched to any one of the value of point 1008 and the value of point 1009 as two similitude candidates calculated by reducing parameter $\sigma_{vU(inter)}$ (R) so as to reduce the inter-frame similitude $Sc_1(r, t_0-1)$. The judgment condition to select any one of the two similitude candidates varies depending on the comparison result as to whether or not points 1008 and 1009 are included in the region of the central area shown by dotted diagonal lines in FIG. 10B and which of points 1008 and 1009 is closer to the boundary line 1010.

In the example shown in FIG. 10B, since point 1009 is included in the region of the central area shown by dotted diagonal lines, the value of point 1009 is selected.

That is, the judgment condition to select one of the aforementioned two similitude candidates is set based on the effect that the amount of noise reduction is set to a level equivalent to that of the stationary state by approximating to the sum total of similitude when the stationary state is assumed, This makes it possible to relatively suppress influences of inter-frame similitude, and thereby prevent the micro structure from being crushed more than necessary.

A case has been described above where a more suitable intra-frame similitude or inter-frame similitude is determined using the intra-frame similitude sum total and inter-frame similitude sum total as parameters, but according to the aforementioned condition, it is necessary to judge whether or not the extraction region $P(r, t_0)$ has an edge section, In the present embodiment, suppose the edge presence/absence judgment result of the edge presence/absence judging section 508 is used as the judgment result as to whether or not the extraction region $P(r, t_0)$ has an edge section.

Therefore, when there is an edge in the extraction region $P(r, t_0)$ and $\Sigma Sc_1(r, t_0) > \Sigma Sc_1(r, t-1)+\epsilon$, the intra-frame similitude sum total selection section 602 selects one of the values of $\Sigma Sc_2(r, t_0)$ and $\Sigma Sc_3(r, t_0)$, whichever is closer to the value of $2\Sigma Sc_1(r, t_0)-\Sigma Sc_1(r, t_0-1)-\epsilon$, and uniformly selects the value of $Sc_1(r, t_0)$ otherwise, Furthermore, when there is no edge in the extraction region $P(r, t_0)$ and $\Sigma Sc_1(r, t_0)+\epsilon < \Sigma Sc_1(r, t_0-1)$, the inter-frame similitude sum total selection section 603 selects one of the values of $\Sigma Sc_2(r, t_0-1)$ and $Sc_3(r, t_0-1)$, whichever is closer to the value of $\Sigma Sc_1(r, t_0)+\epsilon$, and uniformly selects the value of $Sc_1(r, t_0-1)$ otherwise.

The intra-frame similitude selection section 510 and inter-frame similitude selection section 511 each select one corresponding similitude based on the inputted similitude index value and output the selection result to the filter coefficient calculating section 207.

The filter coefficient calculating section 207 calculates filter coefficients $F(r, t_0)$ and $f(r, t_0-1)$ corresponding to the extraction regions $P(r, t_0)$ and $P(r, t_0-1)$ made up of $N_x \times N_y \times 2$ pixels based on the similitude $S(r, t_0)$ selected by the intra-frame similitude selection section 510 and the similitude $S(r, t_0-1)$ selected by the inter-frame similitude selection section 511 using following equations (15) and (16).

$$F(r, t_0) = S(r, t_0) \times W_{intra}(|r-r_0|) \quad (15)$$

$$F(r, t_0-1) = S(r, t_0-1) \times W_{inter}(|r-r_0|) \quad (16)$$

$W_{intra}(|r-r_0|)$ in equation (15) above and $W_{inter}(|r-r_0|)$ in equation (16) above are distance weights to he assigned to the position $r_0$ of the pixel to be processed, and to be more specific, are expressed as following equations (17) and (18) respectively.

$$W_{intra}(|r-r_0|) = \exp(-\{|r-r_0|/\sigma_{s(intra)}\}^2/2) \quad (17)$$

$$W_{inter}(|r-r_0|) = \exp(-\{|r-r_0|/\sigma_{s(inter)}\}^2/2) \quad (18)$$

Here, suppose $\sigma_{s(intra)}$ in equation (17) above and $\sigma_{s(inter)}$ in equation (18) above are predetermined constants. Furthermore, the value of $W_{intra}(|r-r_0|)$ in equation (17) above and the value of $W_{inter}(|r-r_0|)$ in equation (18) above can be stored as a ROM table through preliminary calculations.

The filter coefficient calculating section 207 outputs the calculated $F(r, t_0)$ and $F(r, t_0\_1)$ to the noise reduction processing section 208.

Next, the detailed configuration of the noise reduction processing section 208 will be described with reference to FIG. 11.

The noise reduction processing section 208 is configured by including a product-sum operation processing section 1101, a normalization processing section 1102, a reciprocal conversion LUT 1103, a noise estimate calculating section 1104 and a coring processing section 1105.

According to the noise reduction processing section 208 in the configuration shown in FIG. 11, the filter coefficients $F(r, t_0)$ and $F(r, t_0-1)$ outputted from the filter coefficient calculating section 207 are inputted to the product-sum operation processing section 1101 and the normalization processing section 1102, and the extraction region $P(r, t_0)$ and $P(r, t_0-1)$ outputted from the region extraction section 201 are inputted to the product-sum operation processing section 1101 and the coring processing section 1105. Furthermore, according to the noise reduction processing section 208 in the configuration shown in FIG. 11, parameters deriving from noise amount calculation outputted from the control section 210 are inputted to the noise estimate calculating section 1104.

The product-sum operation processing section 1101 performs product-sum operation processing based on the filter coefficients $F(r, t_0)$ and $F(r, t_0-1)$, and the extraction regions $P(r, t_0)$ and $P(r, t_0-1)$, thereby calculates a reference signal $R(r_0, t_0)$ before normalization and outputs the calculation result to the normalization processing section 1102. Here, the reference signal $R(r_0, t_0)$ is calculated using following equation (19).

$$R(r_0, t_0) = \Sigma_r \{F(r, t_0)P(r, t_0) + F(r, t_0-1)\} \quad (19)$$

The normalization processing section 1102 calculates the sum total of the filter coefficients $F(r, t_0)$ and $F(r, t_0-1)$ and calculates a normalization coefficient $Norm(r_0)$ based on the sum total. The normalization processing section 1102 then converts the calculated normalization coefficient $Norm(r_0)$ to a reciprocal using the reciprocal conversion LUT 1103 and outputs the conversion result to the noise estimate calculating section 1104. The normalization coefficient $Norm(r_0)$ is calculated using following equation (20).

$$Norm(r_0) = \Sigma_r \{F(r, t_0) + F(r, t_0-1)\} \quad (20)$$

After that, the normalization processing section 1102 applies normalization processing to the reference signal $R(r_0, t_0)$, thereby calculates $Rn(r_0, t_0)$ and outputs the calculation result to the noise estimate calculating section 1104. $Rn(r_0, t_0)$ is calculated using following equation (21).

$$Rn(r_0, t_0) = R(r_0, t_0)/Norm(r_0) \quad (21)$$

The noise estimate calculating section 1104 is configured to perform basically the same processing as that of the noise amount estimation section 205 except in that a reference signal $Rn(r_0, t_0)$ s already provided as an input signal.

Here, the noise estimation method in the noise estimate calculating section 1104 will be described with reference to FIG. 8.

$Rn(r_0, t_0)$ is converted to an amount of noise $N(Rn(r_0, t_0))$ by the noise model $Nm(R)$ obtained through preliminary measurement as shown in FIG. 8.

The noise model $Nm(Rn(r_0, t_0))$ in the image pickup apparatus is calculated as a function applying a least squares method to a polynomial approximate curve obtained by taking images of a plurality of patches which become a uniform brightness region beforehand using a specific image pickup apparatus and then measuring an average brightness value and standard deviation of a predetermined region in each patch. Such a noise model $Nm(Rn(r_0, t_0))$ may keep the polynomial coefficient or may be converted to a LUT as line graph data made up of a plurality of points.

The amount of noise $N(Rn(r_0, t_0))$ is calculated, for example. by multiplying the aforementioned noise model $Nm(Rn(r_0, t_0))$ by a function Pa (amount of gain, exposure time, temperature, . . . ) of parameters that causes the amount of noise to increase such as an amount of gain, ISO sensitivity, exposure time, temperature of the sensor itself specified by the image pickup section 100 and an amount of gain accompanying white balance processing of the color signal separation section 101.

The noise estimate calculating section 1104 calculates the function Pa based on each of the aforementioned parameters inputted via the control section 210. Suppose the function Pa is expressed so as to require a function value such as a polynomial or LUT.

Therefore, the amount of noise $N(Rn(r_0, t_0))$ is calculated by following equation (22).

$$N(Rn(r_0, t_0)) = Nm(Rn(r_0, t_0)) \times Pa(\text{amount of gain, exposure time, temperature,} \ldots) \quad (22)$$

The noise estimate calculating section 1104 outputs the calculated amount of noise $N(Rn(r_0, t_0))$ to the coring processing section 1105.

The coring processing section 1105 performs coring processing based on the pixel to he processed $P(r_0, t_0)$, the reference signal $Rn(r_0, t_0)$ and the amount of noise $N(R)$, thereby calculates a noise reduction processing pixel $P_0(r_0, t_0)$ corresponding to the pixel to be processed $P(r_0, t_0)$ and outputs the calculation result to the interpolation processing section 103 and the frame memory 209.

To be more specific, the coring processing section 1105 assumes $Rn(r_0, t_0)$ to be a noise reduction processing pixel $P_0(r_0, t_0)$ when $|P(r_0, t_0) - Rn(r_0, t_0)| < N(Rn(r_0, t_0))$. Furthermore, the coring processing section 1105 assumes $P(r_0, t_0) - N(Rn(r_0, t_0))$ to be a noise reduction processing pixel $P_0(r_0, t_0)$ when $P(r_0, t_0) - Rn(r_0, t_0) \geq N(Rn(r_0, t_0))$. On the other hand, the coring processing section 1105 assumes $P(r_0, t_0) + N(Rn(r_0, t_0)) + N(Rn(r_0, t_0))$ to be a noise reduction processing pixel $P_0(r_0, t_0)$ when $P(r_0, t_0) - Rn(r_0, t_0) \leq -N(Rn(r_0, t_0))$.

As described above, according to the noise reduction processing of the present embodiment, a three-dimensional bilateral filter coefficient is calculated while modifying intra-frame and inter-frame similitudes calculated with reference to the amount of noise according to the local state of a moving image, and it is thereby possible to extract a noise reduction effect to a maximum depending on whether a moving image is moving or stationary and further maintain the micro structure as required.

Next, the procedure for processing performed by the noise reduction section 102 for a one frame period will be described with reference to a flowchart in FIG. 12.

After color-separated single color data in the current frame inputted from the color signal separation section 101 is stored in the N-line memory 200 of the noise reduction section 102, a predetermined region made up of a pixel to be processed at a current time and pixels in a region peripheral to the pixel to be processed is extracted from the N-line memory 200 and the frame memory 209 in which past frame data subjected to noise reduction processing preceding by one frame period is stored (step 1201).

Next, the amount of noise superimposed on the pixel to be processed is estimated from the extraction region of the current frame (step 1202) and an intra-frame similitude and an inter-frame similitude corresponding to the pixel to be processed are calculated based on the noise estimate (step 1203).

Furthermore, the presence/absence of an edge of the extraction region is judged based on the intra-frame similitude and the noise estimate (step 1204) and the intra-frame similitude and the inter-frame similitude are corrected based on the sum total of intra-frame similitude and the sum total of inter-frame similitude and the edge presence/absence judgment result (step 1205).

A filter coefficient to be applied to the extraction region in the current frame is calculated using the corrected intra-frame similitude and the inter-frame similitude (step 1206), filter processing on the extraction region is performed based on the calculated filter coefficient and a result of noise reduction processing on the pixel to be processed is calculated (step 1207).

The pixel to be processed subjected to noise reduction processing is outputted to the interpolation processing section 103 and also stored in a recursive frame memory for holding as the past frame (step 1208).

After that, it is judged whether or not the pixel to he processed is the last pixel within one frame (step 1209) and when the pixel to he processed is not the last pixel within one frame, a series of processes from step 1201 is repeatedly performed. On the other hand, when the pixel to he processed is the last pixel within one frame, a series of processes is finished.

However, according to the noise reduction processing using a recursive three-dimensional bilateral filter, when an inter-frame similitude is set as a condition under which no afterimage is produced in the edge section of the dynamic region, an obtrusive image results which includes noise that cannot be reduced in the periphery of the edge section as a side effect thereof.

By contrast, according to the present embodiment, a filter coefficient is calculated by changing the intra-frame similitude to a greater similitude with a limitation based on the amount of noise for only the periphery of the edge, and it is thereby possible to reduce obtrusive noise and further perform control so that the structure is not crushed more than necessary. Furthermore, according to the present embodiment, a filter coefficient is calculated while changing the inter-frame similitude so as to be reduced with a limitation based on the amount of noise with respect to a micro structure region at a level that can be affected by noise in the dynamic region, and it is thereby possible to leave the micro structure without reducing the noise reduction effect more than necessary.

Although a case has been described in the present embodiment where noise reduction processing using a three-dimensional bilateral filter is used, the noise reduction processing is not limited to this case, but it is possible to obtain a similar effect using, for example. a rational filter instead of a bilateral filter. The similitude in this case is calculated based on the reciprocal of the result of an addition of the difference absolute value of the brightness difference and the estimated amount of noise included in the pixel to be processed. Furthermore, the similitude may also be calculated using an arbitrary function that gives a smaller value as the difference absolute value of the brightness difference normalized with noise increases.

Although the present embodiment has adopted a configuration where three similitude candidates are calculated beforehand in inter-frame and intra-frame similitudes respectively and then a final similitude is selected from among the candidates. the present invention is not limited to such a configuration, but it is also possible to adopt a configuration where two or four or more similitude candidates are calculated beforehand in inter-frame and intra-frame similitudes respectively and then a final similitude is selected from among the candidates.

Although the present embodiment has adopted a configuration using a recursive three-dimensional filter, the filter may not he a recursive one. In this case, it is possible to adopt a configuration such that input of a frame memory for generating a frame delay is connected to an input signal.

(Second Embodiment)

Figure 13:
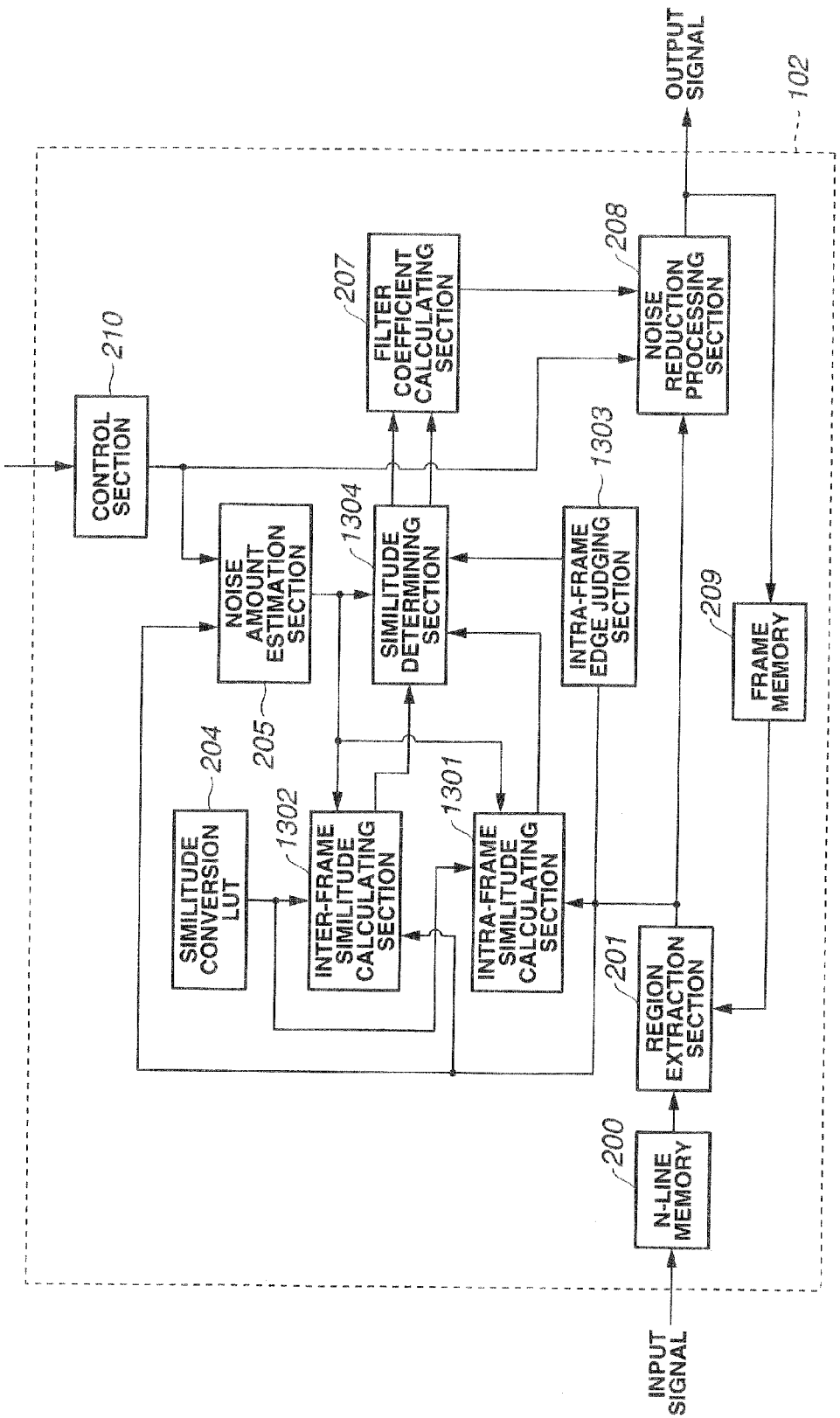
FIG. 13 is a function block diagram illustrating an example of a specific configuration of the noise reduction section according to a second embodiment.
Figure 14:
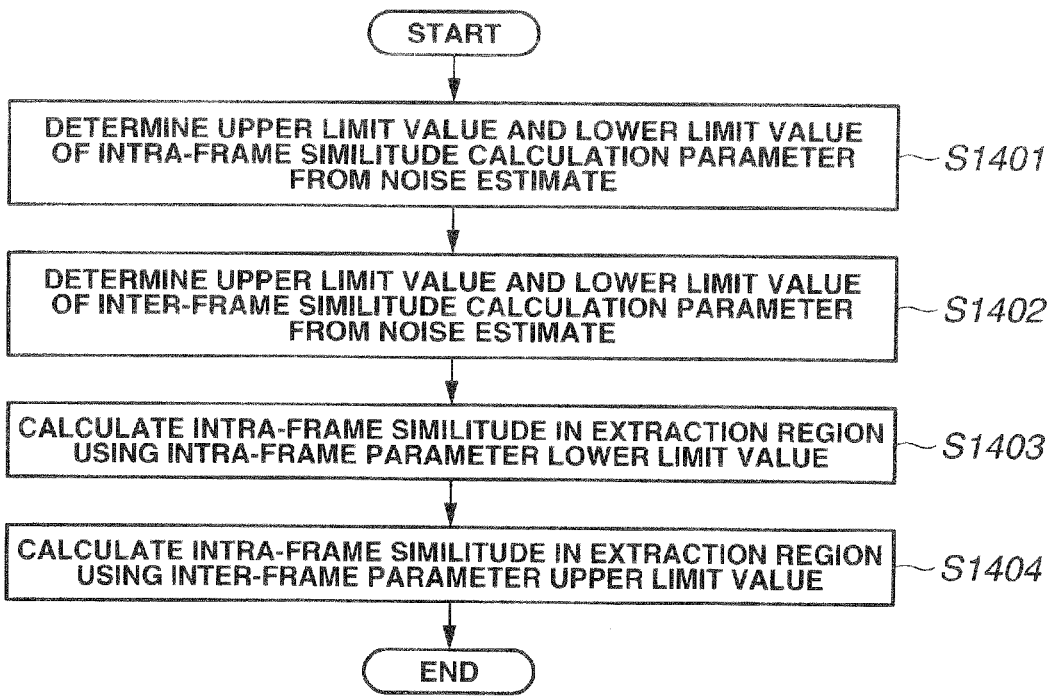
FIG. 14 is a flowchart illustrating part of processing performed in the noise reduction section according to the second embodiment.
Figure 15:
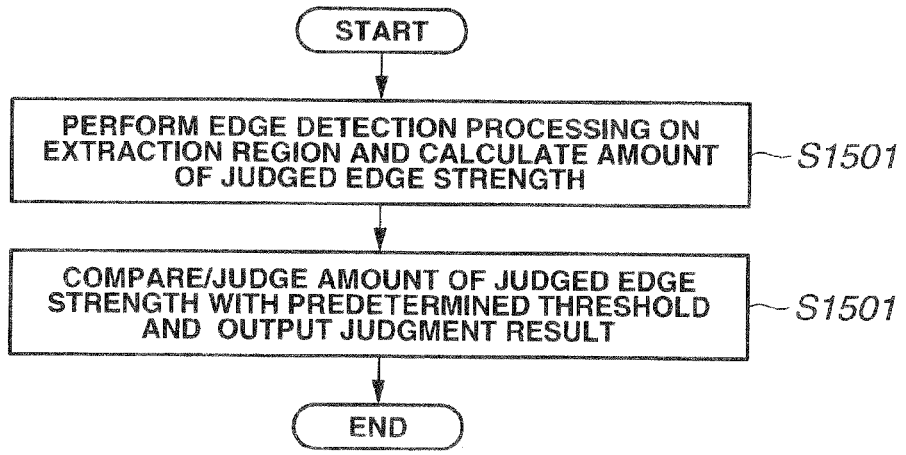
FIG. 15 is a flowchart illustrating part of processing different from FIG. 14 performed in the noise reduction section according to the second embodiment.
Figure 16:
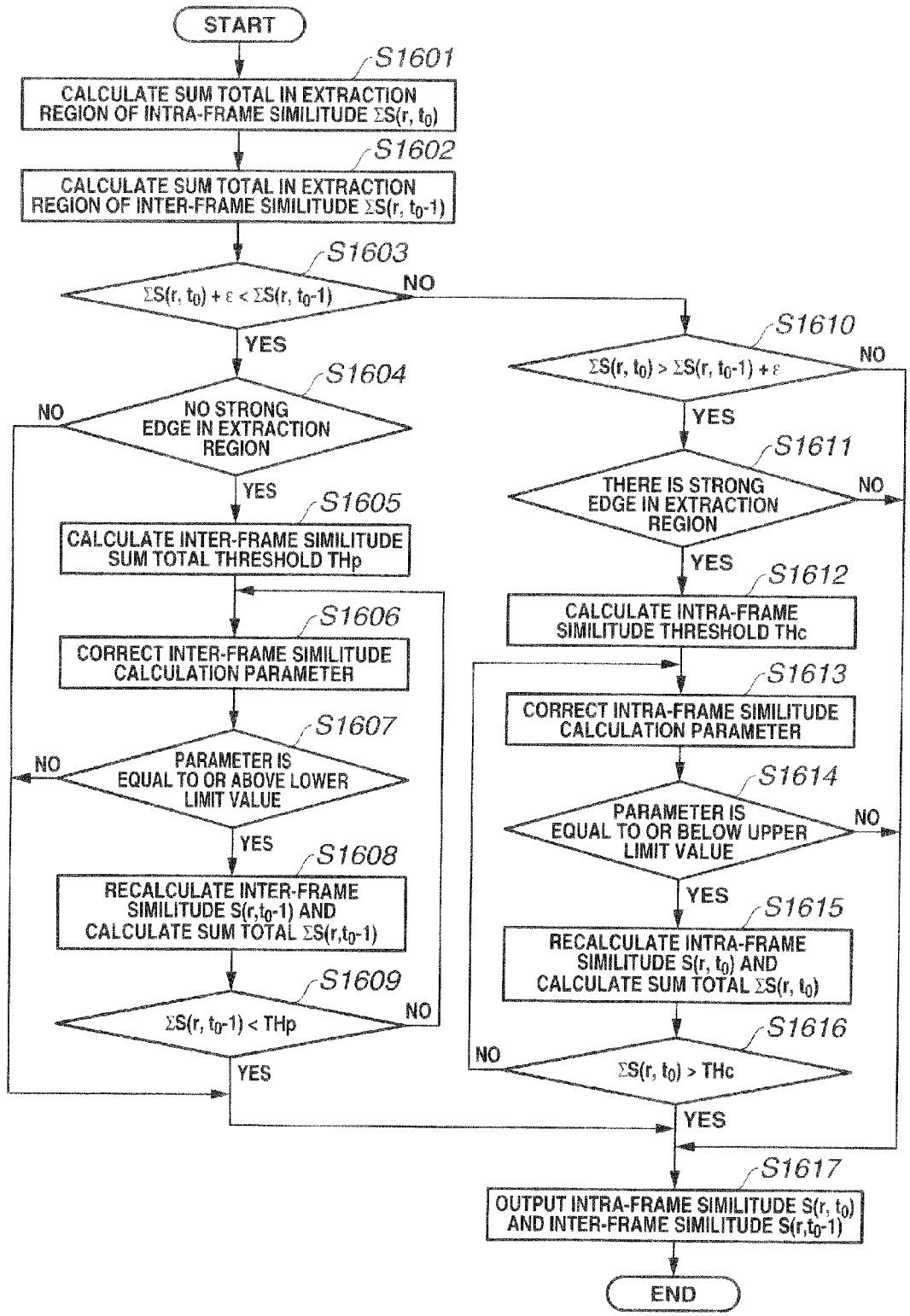
FIG. 16 is a flowchart illustrating part of processing different from FIG. 14 and FIG. 15 performed in the noise reduction section according to the second embodiment.

FIG. 13 to FIG. 16 are related to a second embodiment of the present invention. FIG. 13 is a function block diagram illustrating an example of a specific configuration of the noise reduction section according to the second embodiment. FIG. 14 is a flowchart illustrating part of processing performed in the noise reduction section according to the second embodiment. FIG. 15 is a flowchart illustrating part of processing different from FIG. 14 performed in the noise reduction section according to the second embodiment. FIG. 16 is a flowchart illustrating part of processing different from FIG. 14 and FIG. 15 performed in the noise reduction section according to the second embodiment.

In the following descriptions, detailed descriptions of parts having similar configurations as those in the first embodiment will he omitted, Furthermore, the configuration of the noise reduction section of the present embodiment is similar to the configuration of the noise reduction section 102 according to the first embodiment. Thus, parts different from those of the noise reduction section 102 of the first embodiment will be described mainly in the present embodiment.

The noise reduction section 102 of the first embodiment performs processing such that the intra-frame similitude calculating section 202 and the inter-frame similitude calculating section 203 calculate three similitude candidates respectively based on the amount of noise of a pixel to be processed and the similitude determining section 206 selects one of the optimum similitudes from the respective candidates. On the other hand, the noise reduction section 102 of the present embodiment divides a. parameter domain set by an upper limit value and a lower limit value, which are similitude calculation parameters defined based on the amount of noise of a pixel to be processed into small portions and perform processing repeatedly until a similitude that satisfied an optimal condition is obtained.

Thus, as shown in FIG. 13, the noise reduction section 102 of the present embodiment has a configuration of an intra-frame similitude calculating section 1301, an inter-frame similitude, calculating section 1302 and a similitude determining section 1304. which is different from that of the noise reduction section 102 of the first embodiment and an intra-frame edge judging section 1303 that directly judges the presence/absence of an edge from the extraction region is newly added.

Here, processing of each of the aforementioned sections will he described with reference to flowcharts in FIG. 14, FIG. 15 and FIG. 16.

A series of processes shown in the flowchart of FIG. 14 corresponds to the processing in step 1203 shown in the flowchart of FIG. 12.

The intra-frame similitude calculating section 1301 determines an upper limit value and a lower limit value, which are intra-frame similitude calculation parameters, based on an amount of noise N of a pixel to be processed $P(r_0, t_0)$ and outputs the determination result to the similitude determining section 1304 (step 1401).

The inter-frame similitude calculating section 1302 determines an upper limit value and a lower limit value, which are inter-frame similitude calculation parameters, based on the amount of noise N of the pixel to be processed $P(r_0, t_0)$ and outputs the determination result to the similitude determining section 1304 (step 1402).

Furthermore, the intra-frame similitude calculating section 1301 calculates an intra-frame similitude using the lower limit value, which is the determined intra-frame similitude calculation parameter, and outputs the calculation result to the similitude determining section 1304 (step 1403).

On the other hand, the inter-frame similitude calculating section 1302 calculates an inter-frame similitude using the upper limit value, which is the determined inter-frame similitude calculation parameter, and outputs the calculation result to the similitude determining section 1304 (step 1404).

A series of processes shown in the flowchart of FIG. 15 corresponds to the processing in step 1204 shown in the flowchart of FIG. 12.

The intra-frame edge judging section 1303 causes a Sobel filter or Laplacian filter to act on a region pixel $P(r, t_0)$ of a region extracted by the region extraction section 201 in horizontal, vertical and diagonal directions, thereby detects edge components, then adds the edge components detected in the extraction region, and thereby calculates an amount of judged edge strength (step 1501).

The intra-frame edge judging section 1303 then compares/judges the amount of the judged edge strength with a predetermined threshold and outputs edge presence/absence information as the judgment result to the similitude determining section 1304 (step 1502).

A series of processes shown in the flowchart of FIG. 16 corresponds to the processing in step 1205 shown in the flowchart of FIG. 12.

The similitude determining section 1304 calculates the sum total $\Sigma S(r, t_0)$ of intra-frame similitude in the extraction region (step 1601) and calculates the sum total $\Sigma S(r, t_0-1)$ of inter-frame similitude in the extraction region (step 1602).

Furthermore, the similitude determining section 1304 determines whether or not the condition of $\Sigma S(r, t_0) + \epsilon < \Sigma S(r, t_0-1)$ holds for the two calculated sum totals $\Sigma S(r, t_0)$ and $\Sigma S(r, t_0-1)$ (step 1603). When the condition does not hold, the similitude determining section 1304 continues to perform processing in step 1610, which will be described later and when the condition holds, the similitude determining section 1304 determines whether or not there is a strong edge in the extraction region (step 1604).

The similitude determining section 1304 makes a judgment based on edge presence/absence information outputted from the intra-frame edge judging section 1303 and thereby calculates, when there is no strong edge in the extraction region, an inter-frame similitude sum total threshold THp (step 1605) and then corrects the inter-frame similitude calculation parameter so as to he reduced by a predetermined amount (step 1606).

The similitude determining section 1304 compares the corrected inter-frame similitude calculation parameter with the lower limit value outputted from the inter-frame similitude calculating section 1302 (step 1607). When the corrected inter-frame similitude calculation parameter is equal to or above the lower limit value, the similitude determining section 1304 outputs the corrected inter-frame similitude calculation parameter to the inter-frame similitude calculating section 1302.

The inter-frame similitude calculating section 1302 recalculates the inter-frame similitude $S(r, t_0-1)$ based on the corrected inter-frame similitude calculation parameter, then returns the recalculation result to the similitude determining section 1304 and calculates the sum total $\Sigma S(r, t_0-1)$ of inter-frame similitude (step 1608).

The similitude determining section 1304 compares the sum total $\Sigma S(r, t_0-1)$ of the recalculated inter-frame similitude with the inter-frame similitude sum total threshold THp (step 1609). When $\Sigma S(r, t_0-1) \leq THp$, the similitude determining section 1304 returns to step 1606 and performs processing there and when $\Sigma S(r, t_0-1)$ THp, the similitude determining section 1304 continues to perform processing in step 1617, which will be described later.

In any one of cases where it is judged through the processing in step 1604 that there is a strong edge and where it is judged through the processing in step 1607 that the corrected parameter is less than the lower limit value, processing in step 1617, which will be described later, is performed.

On the other hand, when the condition of $\Sigma S(r, t_0)+\epsilon <\Sigma(r, t_0-1)$ does not hold for the two calculated sum totals $\Sigma S(r, t_0)$ and $\Sigma S(r, t_0-1)$, the similitude determining section 1304 further determines whether or not the condition of $\Sigma S(r, t_0) > \Sigma S(r, t_0-1)+\epsilon$ holds (step 1610). When the condition does not hold, the similitude determining section 1304 continues to perform processing in step 1617, which will be described later, and when the condition holds, the similitude determining section 1304 determines whether or not there is a strong edge in the extraction region (step 1611).

When there is a strong edge in the extraction region, the similitude determining section 1304 calculates an intra-frame similitude sum total threshold THc (step 1612) and then corrects the intra-frame similitude calculation parameter so as to be increased by a predetermined amount (step 1613).

The similitude determining section 1304 compares the corrected intra-frame similitude calculation parameter with the upper limit value outputted from the intra-frame similitude calculating section 1301 (step 1614). When the corrected intra-frame similitude calculation parameter is equal to or below the upper limit value, the similitude determining section 1304 outputs the corrected intra-frame similitude calculation parameter to the intra-frame similitude calculating section 1301.

The intra-frame similitude calculating section 1301 recalculates the intra-frame similitude $S(r, t_0)$ based on the corrected intra-frame similitude calculation parameter, returns the recalculation result to the similitude determining section 1304 and calculates the sum total $\Sigma S(r, t_0)$ of intra-frame similitude (step 1615). The similitude determining section 1304 compares the recalculated sum total of intra-frame similitude $\Sigma S(r, t_0)$ with the intra-frame similitude sum total threshold Thc (step 1616). When $\Sigma S(r, t_0) \leq THc$, the similitude determining section 1304 returns to step 1613 and performs processing there, and when $\Sigma S(r, t_0) > THp$, the similitude determining section 1304 continues to perform processing in step 1617, which will be described later.

In any one of cases where it is judged through the processing in step 1611 that there is no strong edge and where it is judged through the processing in step 1614 that the corrected parameter exceeds the upper limit value, the processing in step 1617, which will be described later, will be performed.

The similitude determining section 1304 then outputs the updated latest intra-frame similitude $S(r, t_0)$ and inter-frame similitude $S(r, t_0-1)$ to the filter coefficient calculating section 207 (step 1617).

According to the above described processing of the present embodiment, it is possible to finely assign the intra-frame and inter-frame similitude calculation parameters within the set range according to the estimated amount of noise, and thereby accurately adjust to desired intra-frame similitude and inter-frame similitude. Therefore according to the above described processing of the present embodiment, it is possible to calculate a filter coefficient suitable for the structure and amount of noise in a dynamic region and a stationary region.

The present invention is not limited to the above described embodiments, and it goes without saying that various modifications and applications are possible without departing from the spirit and scope of the present invention.

What is claimed is:

1. An image processing apparatus that performs noise reduction processing on images inputted on a time-series basis, comprising:
    a recording section that stores an image to be processed and a past image corresponding to the image to be processed;
    a pixel extraction section that extracts a plurality of pixels in a first predetermined region including a target pixel in the image to he processed and a plurality of pixels in a second predetermined region of the past image corresponding to the target pixel stored in the recording section;
    a noise amount estimation section that estimates an amount of noise corresponding to the target pixel,
    a similitude calculating section that calculates a first similitude between the target pixel in the first predetermined region and pixels peripheral thereto and a second similitude between the target pixel in the first predetermined region and a pixel in the second predetermined region based on the amount of noise;
    a similitude feature value calculating section that calculates a first feature value according to the first similitude in the first predetermined region and a second feature value according to the second similitude in the second predetermined region;
    a similitude correcting section that corrects the first similitude and the second similitude based on the first feature value and the second feature value;
    a filter coefficient calculating section that calculates a filter coefficient corresponding to each pixel of the first predetermined region and each pixel of the second predetermined region based on the first similitude and the second similitude corrected by the similitude correcting section; and
    a noise reduction section that reduces noise of the target pixel based on the filter coefficient.

2. The image processing apparatus according to claim 1, wherein the similitude calculated by the similitude calculating section is a function value whose variable is a coefficient determined based on the absolute value of a difference value of each pixel value in the first predetermined region or the second predetermined region with respect to a pixel value of the target pixel, and the amount of noise.

3. The image processing apparatus according to claim 1, wherein the similitude feature value calculating section calculates a sum total of the first similitude in the first predetermined region as the first feature value and calculates a sum total of the second similitude in the second predetermined region as the second feature value.

4. The image processing apparatus according to claim 3, wherein the similitude feature value calculating section comprises a maximum variation calculating section that calculates a maximum variation in the first predetermined region based on the first similitude in the first predetermined region and the noise amount.

5. The image processing apparatus according to claim 3, further comprising an edge amount detection section that detects an amount of edge in the first predetermined region,
wherein the similitude correcting section further corrects the first similitude based on the amount of edge.

6. The image processing apparatus according to claim 4, wherein the similitude correcting section comprises:
a comparison section that compares the sum total of the first similitude with the sum total of the second similitude;
a first similitude determining section that calculates a first target value with respect to the sum total of the first similitude and corrects the first similitude based on the first target value;
a second similitude determining section that calculates a second target value with respect to the sum total of the second similitude and corrects the second similitude based on the second target value; and
a processing selection section that selects the first similitude determining section or the second similitude determining section based on the comparison result of the comparison section.

7. The image processing apparatus according to claim 6, wherein, based on the comparison result of the comparison section, the processing selection section selects the first similitude determining section when the sum total of the first similitude is judged to be greater than the sum total of the second similitude and selects the second similitude determining section when the sum total of the first similitude is judged to be smaller than the sum total of the second similitude.

8. The image processing apparatus according to claim 6, wherein the first target value is a value resulting from adding the difference between the sum total of the first similitude and the sum total of the second similitude to the sum total of the first similitude.

9. The image processing apparatus according to claim 6, wherein the second target value is the sum total of the first similitude.

10. The image processing apparatus according to claim 1, wherein the filter coefficient determined in the filter determining section corresponds to a bilateral filter.

11. An image processing method that performs noise reduction processing on images inputted on a time-series basis, comprising:
a recording step of storing an image to be processed and a past image corresponding to the image to be processed;
a pixel extracting step of extracting a plurality of pixels in a first predetermined region including a target pixel in the images to be processed and a plurality of pixels in a second predetermined region of the past image corresponding to the target pixel stored in the recording step;
a noise amount estimating step of estimating an amount of noise corresponding to the target pixel;
a similitude calculating step of calculating a first similitude between the target pixel in the first predetermined region and pixels peripheral thereto and a second similitude between the target pixel in the first predetermined region and a pixel in the second predetermined region based on the amount of noise;
a similitude feature value calculating step of calculating a first feature value according to the first similitude in the first predetermined region and a second feature value according to the second similitude in the second predetermined region;
a similitude correcting step of correcting the first similitude and the second similitude based on the first feature value and the second feature value;
a filter coefficient calculating step of calculating a filter coefficient corresponding to each pixel in the first predetermined region and each pixel in the second predetermined region based on the first similitude and the second similitude corrected in the similitude correcting step; and
a noise reducing step of reducing noise of the target pixel based on the filter coefficient.

12. The image processing method according to claim 11, wherein the similitude calculated in the similitude calculating step is a function value whose variable is a coefficient determined based on the absolute value of a difference value of each pixel value in the first predetermined region or the second predetermined region with respect to a pixel value of the target pixel, and the noise amount.

13. The image processing method according to claim 11, wherein in the similitude feature value calculating step, a sum total of the first similitude in the first predetermined region is calculated as the first feature value and a sum total of the second similitude in the second predetermined region is calculated as the second feature value.

14. The image processing method according to claim 13, wherein the similitude feature value calculating step comprises a maximum variation calculating step of calculating a maximum variation in the first predetermined region based on the first similitude in the first predetermined region and the noise amount.

15. The image processing method according to claim 13, further comprising an edge amount detecting step of detecting an amount, of edge in the first predetermined region,
wherein the first similitude is further corrected based on the amount of edge in the similitude correcting step.

16. The image processing method according to claim 14, wherein the similitude correcting step comprises:
a comparing step of comparing the sum total of the first similitude with the sum total of the second similitude;
a first similitude determining step of calculating a first target value with respect to the sum total of the first similitude and correcting the first similitude based on the first target value;
a second similitude determining step of calculating a second target value with respect to the sum total of the second similitude and correcting the second similitude based on the second target value; and
a processing selecting, step of selecting the first similitude determining step or the second similitude determining step based on the comparison result of the comparing step.

17. The image processing method according to claim 16, wherein, based on the comparison result in the comparing step, in the processing selecting step, the first similitude determining step is selected when the sum total of the first similitude is judged to be greater than the sum total of the second similitude and the second similitude determining step is selected when the sum total of the first similitude is judged to be smaller than the sum total of the second similitude.

18. The image processing method according to claim 16, wherein the first target value is a value resulting from adding the difference between the sum total of the first similitude and the sum total of the second similitude to the sum total of the first similitude.

19. The image processing method according to claim 16, wherein the second target value is the sum total of the first similitude.

20. The image processing method according to claim 11, wherein the filter coefficient determined in the filter determining step corresponds to a bilateral filter.

* * * * *